US008845768B2

(12) United States Patent
Wachsman et al.

(10) Patent No.: US 8,845,768 B2
(45) Date of Patent: Sep. 30, 2014

(54) PROTON CONDUCTING MEMBRANES FOR HYDROGEN PRODUCTION AND SEPARATION

(75) Inventors: Eric D. Wachsman, Fulton, MD (US); Heesung Yoon, Gainesville, FL (US); Takkeun Oh, Gainesville, FL (US); Jianlin Li, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 180 days.

(21) Appl. No.: 12/996,687

(22) PCT Filed: Jun. 10, 2009

(86) PCT No.: PCT/US2009/046924
§ 371 (c)(1),
(2), (4) Date: Dec. 7, 2010

(87) PCT Pub. No.: WO2009/152255
PCT Pub. Date: Dec. 17, 2009

(65) Prior Publication Data
US 2011/0084237 A1      Apr. 14, 2011

Related U.S. Application Data

(60) Provisional application No. 61/060,374, filed on Jun. 10, 2008.

(51) Int. Cl.
*C01B 6/24* (2006.01)
*B01D 53/22* (2006.01)

(52) U.S. Cl.
USPC .................................. 48/61; 423/644; 95/55

(58) Field of Classification Search
CPC ........ C01B 3/501; C01B 3/503; B01D 53/22; B01D 2256/16
USPC ......................................... 48/61; 502/4, 300
See application file for complete search history.

(56) References Cited

U.S. PATENT DOCUMENTS 6,214,757 B1    4/2001  Schwartz et al.
(Continued)

OTHER PUBLICATIONS

Oh, T. et al. "Effect of Eu dopant concentration in $SrCe_{1-x}Eu_xO_{3-\delta}$ on ambipolar conductivity," *Solid State Ionics*, 2009, pp. 1233-1239, vol. 180.

(Continued)

*Primary Examiner* — Matthew Merkling
(74) *Attorney, Agent, or Firm* — Saliwanchik, Lloyd & Eisenschenk

(57) ABSTRACT

In one embodiment, a membrane of proton-electron conducting ceramics that is useful for the conversion of a hydrocarbon and steam to hydrogen has a porous support of $M'-Sr_{1-z'}M''_zCe_{1-x'-y'}Zr_{x'}M'''_{y'}O_{3-\delta}$, $Al_2O_3$, mullite, $ZrO_2$, $CeO_2$ or any mixtures thereof where: M' is Ni, Ti, V, Cr, Mn, Fe, Co, Ni, Cu, Nb, Mo, W, Zn, Pt, Ru, Rh, Pd, alloys thereof or mixtures thereof; M" is Ba, Ca, Mg, Sm, Eu, Gd, Tb, Dy, Ho, Er, Tm, or Yb; M''' is Ti, V, Cr, Mn, Fe, Co, Ni, Cu, Nb, Mo, W, Pr, Nd, Pm, Sm, Eu, Gd, Tb, Dy, Ho, Er, Tm, or Yb; z' is 0 to about 0.5; x' is 0 to about 0.5; y' is 0 to about 0.5; and x'+y'>0; for example, Ni—$SrCe_{1-x'}Zr_{x'}O_{3-\delta}$, where x' is about 0.1 to about 0.3. The porous support is coated with a film of a Perovskite-type oxide of the formula $SrCe_{1-x-y}Zr_xM_yO_{3-\delta}$ where M is at least one of Ti, V, Cr, Mn, Fe, Co, Ni, Cu, Nb, Mo, W, Pr, Nd, Pm, Sm, Eu, Gd, Tb, Dy, Ho, Er, Tm, and Yb, x is 0 to about 0.15 and y is about 0.1 to about 0.3. By including the Zr and M in the oxide in place of Ce, the stability can be improved while maintaining sufficient hydrogen flux for efficient generation of hydrogen. In this manner, the conversion can be carried out by performing steam methane reforming (SMR) and/or water-gas shift reactions (WGS) at high temperature, where the conversion of CO to $CO_2$ and $H_2$ is driven by the removal of $H_2$ to give high conversions. Methods of preparing the membrane cells and a system for use of the membrane cells to prepare hydrogen are presented. A method for sequestering $CO_2$ by reaction with methane or other hydrocarbon catalyzed by the novel membrane to form a syngas is also presented.

10 Claims, 24 Drawing Sheets

(56) References Cited

U.S. PATENT DOCUMENTS

| | | | |
|---|---|---|---|
| 6,281,403 | B1 | 8/2001 | White et al. |
| 6,569,226 | B1* | 5/2003 | Dorris et al. ............... 95/56 |
| 6,899,744 | B2 | 5/2005 | Mundschau |
| 7,001,446 | B2 | 2/2006 | Roark et al. |
| 2001/0001379 | A1* | 5/2001 | Wachsman et al. ............ 95/55 |
| 2005/0109037 | A1* | 5/2005 | Deckman et al. ............ 60/777 |
| 2005/0194571 | A1* | 9/2005 | Elangovan et al. ......... 252/500 |

OTHER PUBLICATIONS

Li, J. et al., "Stability of $SrCe_{1-x}Zr_xO_{3-\delta}$ Under Water Gas Shift Reaction Conditions," *Journal of The Electrochemistry Society*, 2010, pp. B383-B387, vol. 157, No. 3.

Li, J. et al., "$SrCe_{0.7}Zr_{0.2}Eu_{0.1}O_3$-based Hydrogen Transport Water Gas Shift Reactor," *International Journal of Hydrogen Energy*, 2012, pp. 16006-16012, vol. 37.

Oh, T. et al., "Hydrogen Permeation Through Thin Supported $SrZr_{0.2}Ce_{0.8-x}Eu_xO_{3-\delta}$ Membranes," *Journal of Membrane Science*, 2009, pp. 1-4, vol. 345.

Yoon, H. et al., "Fabrication of Thin Film $SrCe_{0.9}Eu_{0.1}O_{3-\delta}$ Hydrogen Separation Membranes on Ni—$SrCeO_3$ Porous Tubular Supports," *Journal of the American Ceramic Society*, 2009, pp. 1849-1852, vol. 92, No. 8.

\* cited by examiner (a)

(b)

(a)

(b)

(c)

PROTON CONDUCTING MEMBRANES FOR HYDROGEN PRODUCTION AND SEPARATION

CROSS-REFERENCE TO RELATED APPLICATIONS

This application is the U.S. national stage application of International Patent Application No. PCT/US2009/046924, filed Jun. 10, 2009, which claims the benefit of U.S. Provisional Application Ser. No. 61/060,374, filed Jun. 10, 2008, the disclosures of which are hereby incorporated by reference in their entireties, including any figures, tables, or drawings.

GOVERNMENT SUPPORT

The subject matter of this application has been supported in part by a research grant from the National Aeronautic and Space Administration under Grant No. NAG3-2930. Accordingly, the government has certain rights in this invention.

BACKGROUND

Presently, about 95% of the 9 million tons of hydrogen produced in the United States uses a thermal process with natural gas as the feedstock. The most common process involves steam methane reforming (SMR) and water-gas shift reactions (WGS) at high temperature. Hydrogen gas must then be separated from the resultant mixed gas stream.

SMR is an endothermic process where methane and water are converted into hydrogen and carbon monoxide by the equation:

$$CH_4 + H_2O \leftrightharpoons 3H_2 + CO.$$

WGS is an exothermic process that converts carbon monoxide and water to hydrogen and carbon dioxide:

$$CO + H_2O \leftrightharpoons H_2 + CO_2.$$

Coupling the SMR to the WGS reaction yields a net reaction of:

$$CH_4 + 2H_2O \leftrightharpoons 4H_2 + CO_2.$$

In addition to or in place of the methane, higher hydrocarbons or alcohols can be used to generate $H_2$ by SMR and WGS, as illustrated for alkanes and mono hydroxy substituted alcohols:

$$C_nH_{2n+2} + 2nH_2O \leftrightharpoons 3n+1H_2 + nCO_2$$

$$C_nH_{2n+1}OH + 2n-1H_2O \leftrightharpoons 3nH_2 + nCO_2.$$

Membrane reactor technology allows economic production of high purity hydrogen from natural gas, gasified coal, biomass, and other hydrocarbon feedstocks by coupling steam reforming and hydrogen transport in one step. Removal of product hydrogen continuously through the membrane shifts the equilibrium toward increased hydrogen production. Palladium metal alloy membranes have been available for hydrogen production for several decades, but these membranes are expensive and require large areas for adequate fluxes in commercial applications. In addition to industrial hydrogen production, efforts have been made to use SMR and WGS reactors and hydrocarbon fuels with hydrogen fuel cells in automotive applications to exploit the efficiencies of hydrogen fuel cell, which are generally more than twice that of internal combustion engines.

SMR is typically run at steam concentrations higher than the reaction stoichiometry to improve conversion. When the molar water-to-carbon ratio is large, WGS takes place in the same reactor allowing conversion of the hydrocarbons to $H_2$ and $CO_2$. Additionally, reactors that promote SMR and WGS must be robust as a number of secondary reactions, such as carbon formation, can occur that are detrimental to the performance of the reactor. The use of higher stoichiometry of water-to-carbon can significantly diminish the formation of undesired byproducts of these reactions. Higher temperatures also diminish the observance of these byproducts. As the SMR reaction is endothermic, high temperatures are favorable for the promotion of the reaction. On the other hand, WGS is mildly exothermic and reversible and the equilibrium constant for the formation of hydrogen is greater at lower temperatures, where the reaction rate is low. Hence, reaction is best carried out at higher temperatures in a manner that hydrogen is readily and rapidly removed from the reactor by having a high flux rate through the membrane to drive the equilibrium reaction to high conversion.

Perovskite-type oxides (e.g. $BaCe_{1-x}M_xO_3$, where M is a metal dopant) have been shown to have high proton conductivities at elevated temperature, with protonic conductivities on the order of $10^{-2}\Omega^{-1}\,cm^{-1}$ at 600° C. As the hydrogen permeates through the membrane as a proton, separation selectivity for hydrogen is nearly absolute, allowing the collection of extremely pure hydrogen. The potential permeation flux rate of these materials is also extremely high if sufficient electronic conductivity can be achieved.

$BaCe_{1-x}$-$M_xO_3$-type protonic conductors have insufficient electronic conductivity to balance the transport of charge through the material. To address these problem similar type protonic conductors, particularly $BaCe_{1-x}Gd_xO_3$, have been used to form a two phase proton and electric conductor where Pd acts as the electron conductor phase, as disclosed in Wachsman et al., U.S. Pat. No. 6,235,417. A subsequent patent to Wachsman et al., U.S. Pat. No. 6,296,687 discloses a mixed protonic-electronic conducting material useful as a $H_2$ permeable membrane or electrode that comprises $BaCe_{1-x}M_xO_3$-type conductors when M is a multivalent dopant metal.

Unfortunately, these systems have not demonstrated sufficient chemical stability for many commercial applications involving hydrogen production. There remains the need for improved stable membranes where high flux is achieved. Additionally, it is desirable to use such membranes in a reactor where a single high temperature is employed for hydrogen production and separation. It is also desirable to readily fabricate such a ceramic membrane reactor.

SUMMARY OF THE INVENTION

Embodiments of the invention are directed to a membrane of proton conducting ceramics where a porous support comprising $M'\text{-}Sr_{1-z}M''_zCe_{1-x'-y'}M'''_{y'}O_{3-d}$, $Al_2O_3$, mullite, $ZrO_2$, $CeO_2$ or any mixtures thereof where: M' is Ni, Ti, V, Cr, Mn, Fe, Co, Ni, Cu, Nb, Mo, W, Zn, Pt, Ru, Rh, Pd, alloys thereof or mixtures thereof; M'' is Ba, Ca, Mg, Sm, Eu, Gd, Tb, Dy, Ho, Er, Tm, or Yb; M''' is Ti, V, Cr, Mn, Fe, Co, Ni, Cu, Nb, Mo, W, Pr, Nd, Pm, Sm, Eu, Gd, Tb, Dy, Ho, Er, Tm, or Yb; z' is 0 to about 0.5; x' is 0 to about 0.5; y' is 0 to about 0.5; and x'+y'>0, for example, Ni—$SrCe_{1-x}Zr_xO_{3-d}$, where x' is about 0.1 to about 0.3, has a surface covered by a film comprising a Perovskite-type oxide of the formula $SrCe_{1-x-y}Zr_xM_yO_{3-d}$ where M is at least one of Ti, V, Cr, Mn, Fe, Co, Ni, Cu, Nb, Mo, W, Pr, Nd, Pm, Sm, Eu, Gd, Tb, Dy, Ho, Er, Tm, and Yb, x is 0 to about 0.15 and y is about 0.1 to about 0.3. In some embodiments of the invention it is advantageous that at least two of x', y' and z' are greater than 0, for example greater than 0.01. In some embodiments of the invention it is advantageous that x' is greater than 1. The film can be about 1 to about 50 μm in thickness. In an embodiment of the invention, superior stability is achieved with a Perovskite-type oxide of the formula $SrCe_{1-x-y}Zr_xM_yO_{3-d}$ where x is 0.1 to 0.2. The hydrogen permeation is improved because of the inclusion of M, and in one effective embodiment M is Eu.

Another embodiment of the invention is a method for construction of membranes of proton conducting ceramics described above. The method involves providing a porous support comprising $M'\text{-}Sr_{1-z}M''_zCe_{1-x'-y'}Zr_{x'}M'''_{y'}O_{3-d}$, $Al_2O_3$, mullite, $ZrO_2$, $CeO_2$ or any mixtures thereof where: M' is Ni, Ti, V, Cr, Mn, Fe, Co, Ni, Cu, Nb, Mo, W, Zn, Pt, Ru, Rh, Pd, alloys thereof or mixtures thereof; M'' is Ba, Ca, Mg, Sm, Eu, Gd, Tb, Dy, Ho, Er, Tm, or Yb; M''' is Ti, V, Cr, Mn, Fe, Co, Ni, Cu, Nb, Mo, W, Pr, Nd, Pm, Sm, Eu, Gd, Tb, Dy, Ho, Er, Tm, or Yb; z' is 0 to about 0.5; x' is 0 to about 0.5; y' is 0 to about 0.5; and x'+y'>0, for example, $Ni\text{—}SrCe_{1-x'}Zr_{x'}O_{3-d}$, where x' is about 0.1 to about 0.3, and a slurry of $SrCe_{1-x-y}Zr_xM_yO_{3-d}$ where M is at least one of Ti, V, Cr, Mn, Fe, Co, Ni, Cu, Nb, Mo, W, Pr, Nd, Pm, Sm, Eu, Gd, Tb, Dy, Ho, Er, Tm, and Yb, x is 0 to about 0.15 and y is about 0.1 to about 0.3, where the slurry is deposited as a film coating a surface of the porous support. In one embodiment a precursor $M'O\text{—}Sr_{1-z}M''_zCe_{1-x'-y'}Zr_{x'}M'''_{y'}O_{3-d}$ can be used and reduced to the $M'\text{-}Sr_{1-z}M''_zCe_{1-x'-y'}Zr_{x'}M'''_{y'}O_{3-d}$ porous support upon reduction that is carried out either before or after the film deposition. Upon sintering the coated support and reducing the NiO of the support to $Ni\text{—}SrCe_{1-x'}Zr_{x'}O_{3-d}$, where x' is about 0.1 to about 0.3, a membrane of proton conducting ceramic results. In one embodiment of the inventive method, the porous support is provided by making a mixture of NiO, $SrCe_{1-x}Zr_xO_{3-d}$ and a fluid which is then ball-milled and degassed and then formed into a desired shape, for example a tube which can be extruded, or tape cast into a green body tape which is then formed into a tube, and sintered to unlit the tubular shaped porous support. The mixture can also include a dispersant, plasticizer and/or binder. The slurry can be provided by combining $SrCO_3$, $CeO_2$, $ZrO_2$, and $Eu_2O_3$, which is ball milled, calcined, ground to a powder and combined with a fluid.

Another embodiment of the invention is directed to a membrane reactor for the production of hydrogen from a hydrocarbon feedstock. The reactor has a high temperature stable housing, at least one membrane of proton conducting ceramics as described above, one or more inlets for hydrocarbons and separate outlets where at least one outlet is an exhaust for water and carbon dioxide and at least one outlet is for the produced hydrogen. The housing is any material that can withstand the heat from the reaction, such as quartz, metal, metal alloy, or ceramic. The hydrocarbon and water are introduced through an inlet to an isolated volume of the reactor in contact with the support side of the membrane free of the $SrCe_{1-x-y}Zr_xM_yO_{3-d}$ film. This volume also includes at least one outlet to exhaust water and carbon dioxide. The hydrogen is withdrawn from an isolated volume on the coated side of the membrane.

Another embodiment of the invention is method of using the membrane in a reactor for the formation of a syngas mixture with variable $H_2/CO$ ratios necessary for subsequent catalytic conversion to chemical feedstocks and liquid fuels.

Another embodiment of the invention is a method of using the membrane in a reactor that utilizes $CO_2$, from other chemical and combustion processes, as a reactant in the formation of hydrogen and syngas mixtures, for subsequent catalytic conversion to chemical feedstocks and liquid fuels, as a method to sequestor $CO_2$ and address global climate change.

BRIEF DESCRIPTION OF THE DRAWINGS

There are shown in the drawings, embodiments, which are presently preferred, it being understood, however, that the invention is not limited to the precise arrangements and instrumentalities shown.

3% CO($H_2O$/CO=2:1): in the absence of a proton conductive membrane, ○ (1:1) and ● (2:1); with a $SrCe_{0.9}Eu_{0.1}O_{3-d}$ on Ni—$SrCeO_3$ proton conductive membrane, □ (1:1), ▎(2:1) and ◆ (2:1) with in situ $H_2$ removal; and the calculated thermodynamic equilibria conversion values,—(1:1) and—(2:1).

Figure 16:
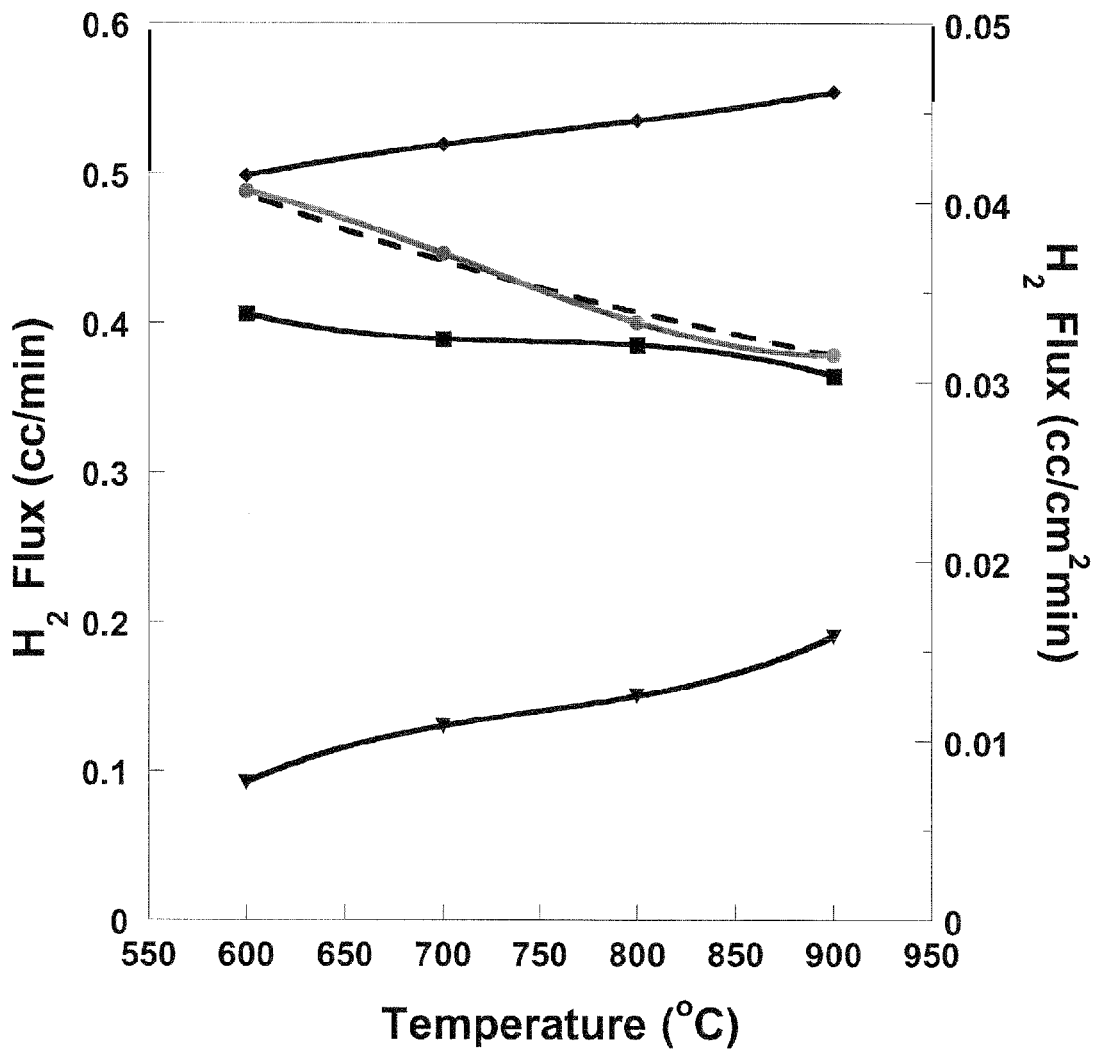

FIG. 16 is a plot of the $H_2$ flux as a function of temperature for 3% CO+6% $H_2O$ using a $SrCe_{0.9}Eu_{0.1}O_{3-d}$ on Ni—$SrCeO_3$ proton conductive membrane for: ● $H_2$ production without a He sweep of permeated $H_2$; ▼ membrane permeated $H_2$; ▎$H_2$ production in the feed side effluent with in situ $H_2$ removal; ◆ total catalytic $H_2$ production with in situ $H_2$ removal; and—calculated thermodynamic equilibrium $H_2$ conversion values.

Figure 17:
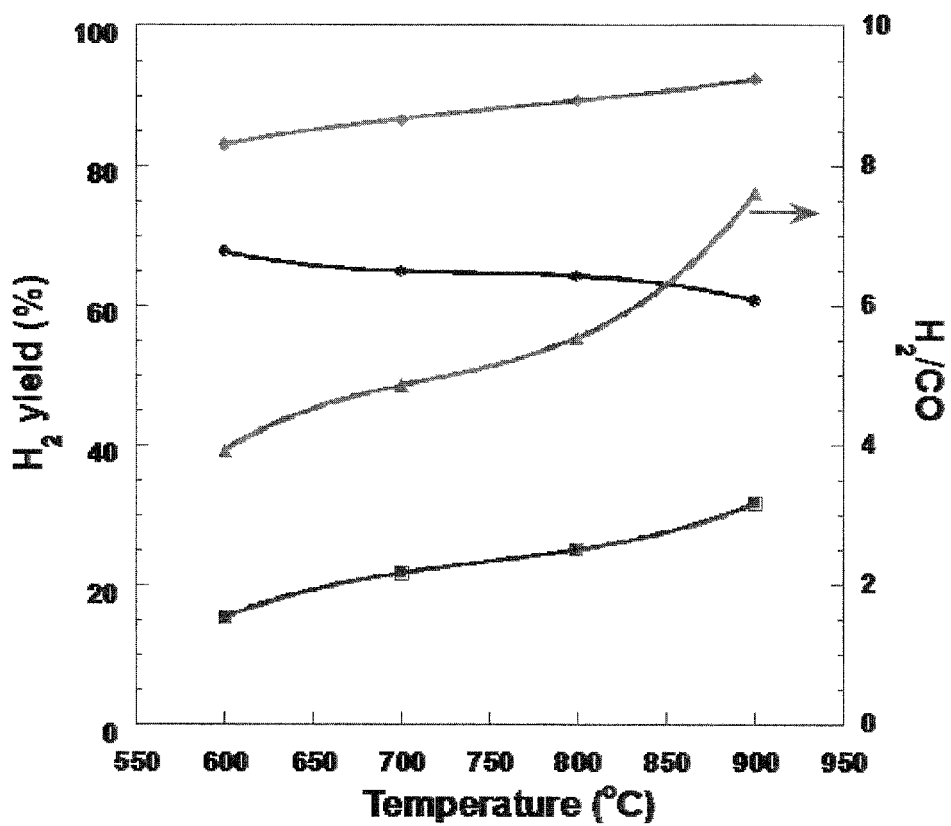

FIG. 17 is a plot of $H_2$ yield (left scale) and $H_2$/CO ratio (right scale) as a function of temperature using a $SrCe_{0.9}Eu_{0.1}O_{3-d}$ on Ni—$SrCeO_3$ proton conductive membrane with 3% CO+6% $H_2O$ and in situ $H_2$ removal where: ▎ permeated $H_2$; ● $H_2$ in the feed effluent; ◆ total $H_2$ yield; and ▲ the $H_2$/CO ratio.

Figure 18:
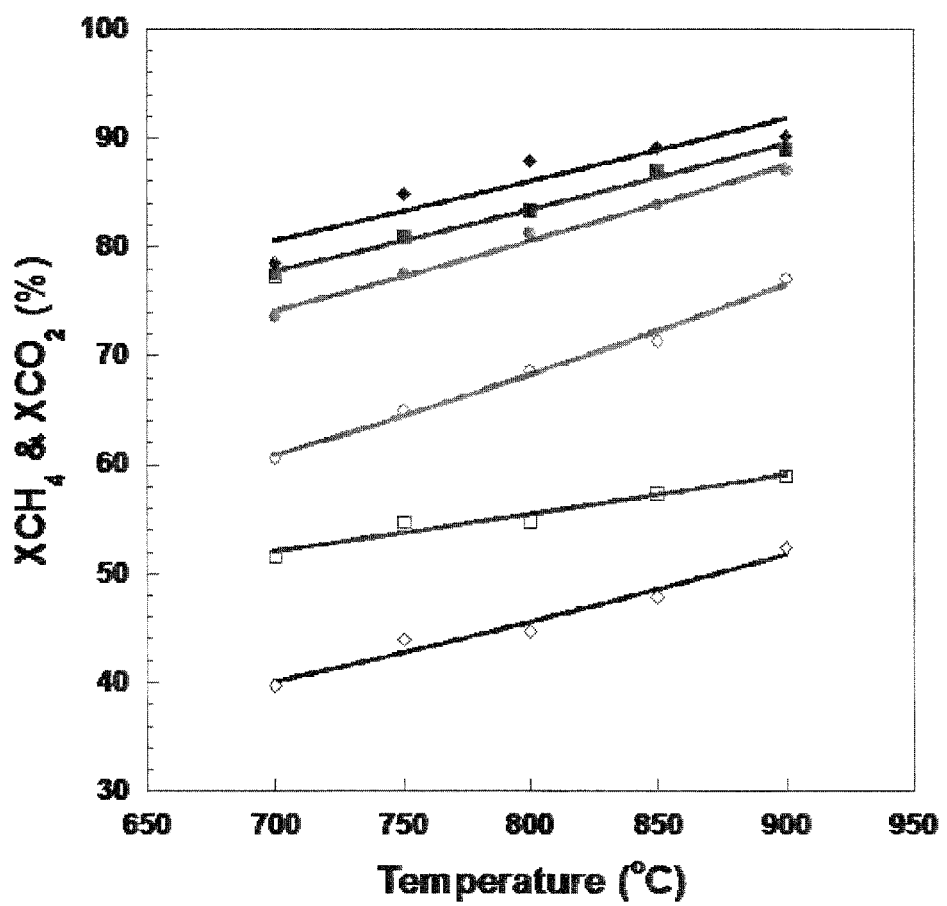

FIG. 18 is a plot of the methane and carbon dioxide conversions ($XCH_4$ and $XCO_2$) as a function of temperature for reforming $CH_4$ and $CO_2$ according to an embodiment of the invention using a $SrCe_{0.7}Zr_{0.2}Eu_{0.1}O_{3-\delta}$ on Ni—$SrCe_{0.8}Zr_{0.2}O_{3-\delta}$ proton conductive membrane with $CH_4/CO_2$ ratios of: 1/2 ◆ ($CH_4$) ▎($CO_2$); 1/1.5 ($CH_4$) □ ($CO_2$); and 1/1 ● ($CH_4$) ○ ($CO_2$).

Figure 19:
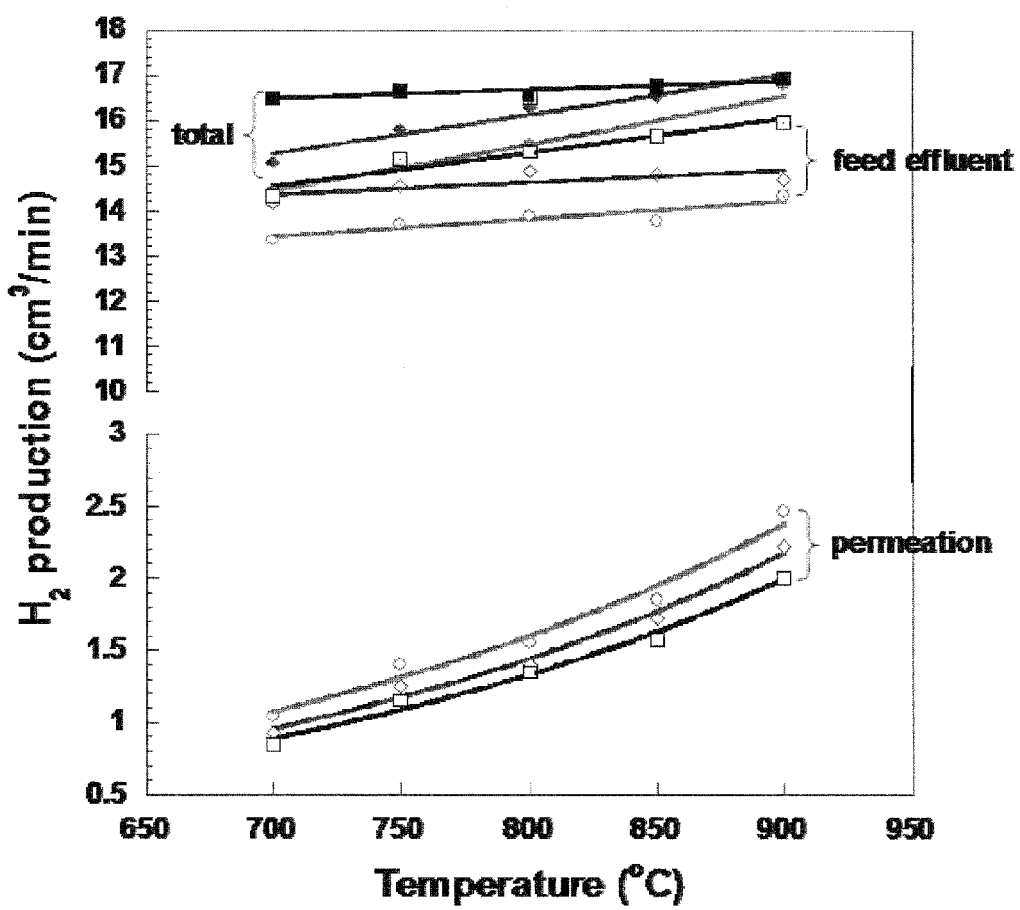

FIG. 19 is a plot of $H_2$ production as a function of temperatures for reforming $CH_4$ and $CO_2$ according to an embodiment of the invention using a $SrCe_{0.7}Zr_{0.2}Eu_{0.1}O_{3-\delta}$ on Ni—$SrCe_{0.8}Zr_{0.2}O_{3-\delta}$ proton conductive membrane for $CH_4/CO_2$ ratios of: 1/1 ◆ (total $H_2$) ◇ ($H_2$ permeated (lower) and in the feed effluent (top)); 1/1.5 ● (total $H_2$) ○ ($H_2$ permeated (lower) and in the feed effluent (top)); and 1/2 ▎(total $H_2$) □ ($H_2$ permeated (lower) and in feed effluent (top)).

Figure 20:
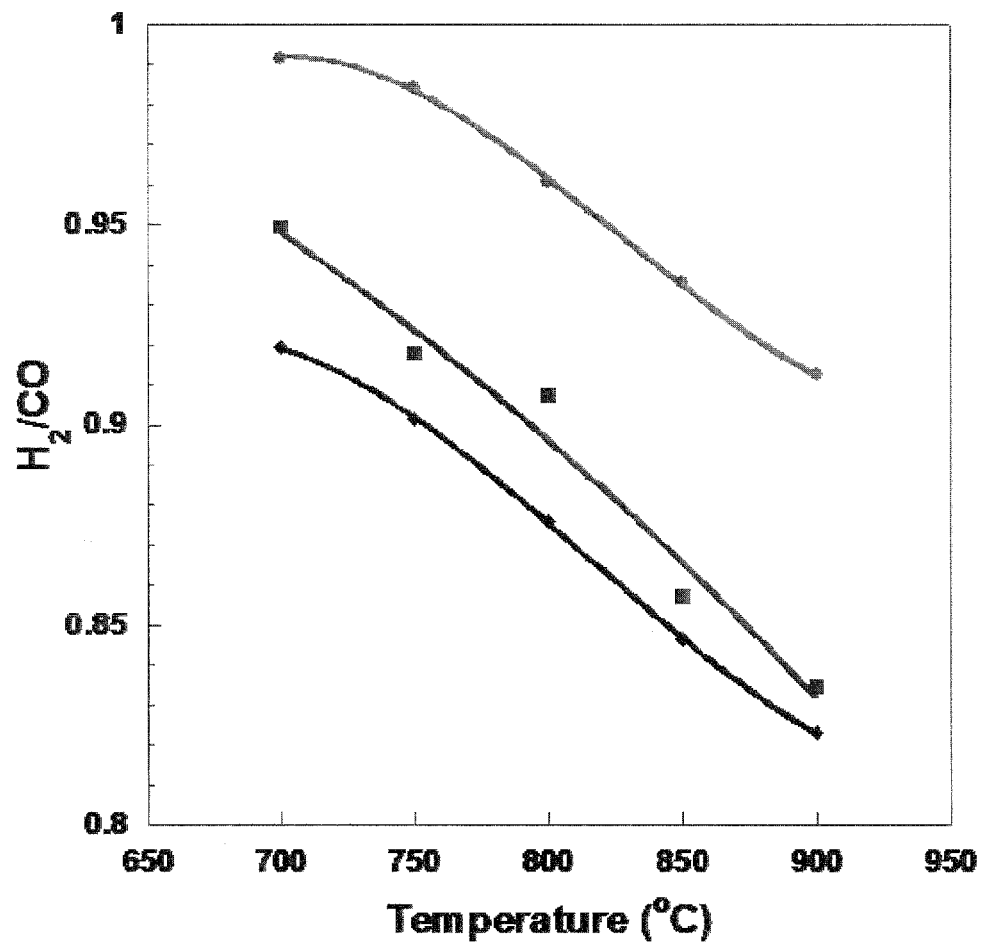

FIG. 20 is a plot of the $H_2$/CO ratio of the feed effluent as a function of temperature using a $SrCe_{0.7}Zr_{0.2}Eu_{0.1}O_{3-\delta}$ on Ni—$SrCe_{0.8}Zr_{0.2}O_{3-\delta}$ proton conductive membrane according to an embodiment of the invention where the $CH_4/CO_2$ feed ratio was ● 1/1 ▎1/1.5 and ◆ 1/2.

Figure 21:
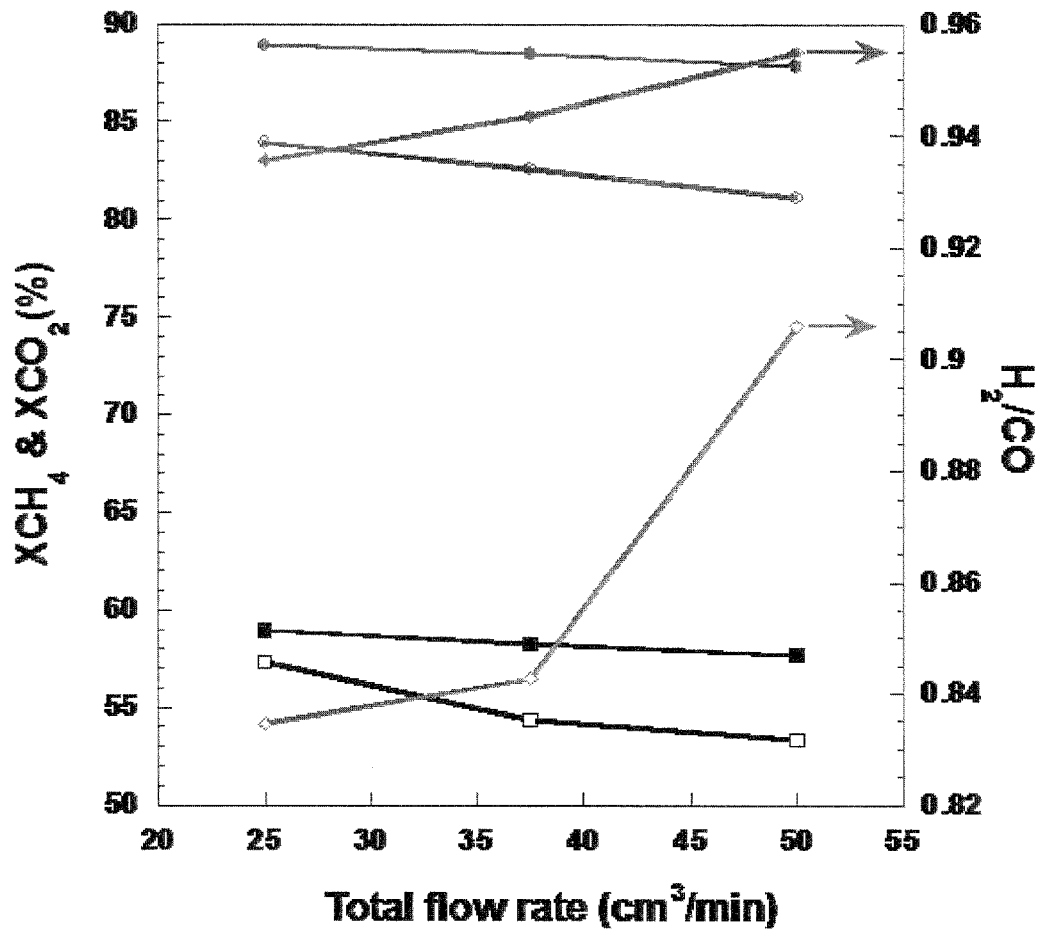

FIG. 21 is a plot of $CH_4$ and $CO_2$ conversions (left scale) and the $H_2$/CO ratio (right scale) at 850° C. and 900° C. measured in the feed effluent from a 1/1.5 $CH_4/CO_2$ feed as a function of total flow rate using a $SrCe_{0.7}Zr_{0.2}Eu_{0.1}O_{3-\delta}$ on Ni—$SrCe_{0.8}Zr_{0.2}O_{3-\delta}$ proton conductive membrane according to an embodiment of the invention where: ○ $XCH_4$, □ $CO_2$ and ◇ $H_2$/CO at 850° C.; and ● $XCH_4$ ▎$CO_2$ and ◆ $H_2$/CO at 900° C.

Figure 22:
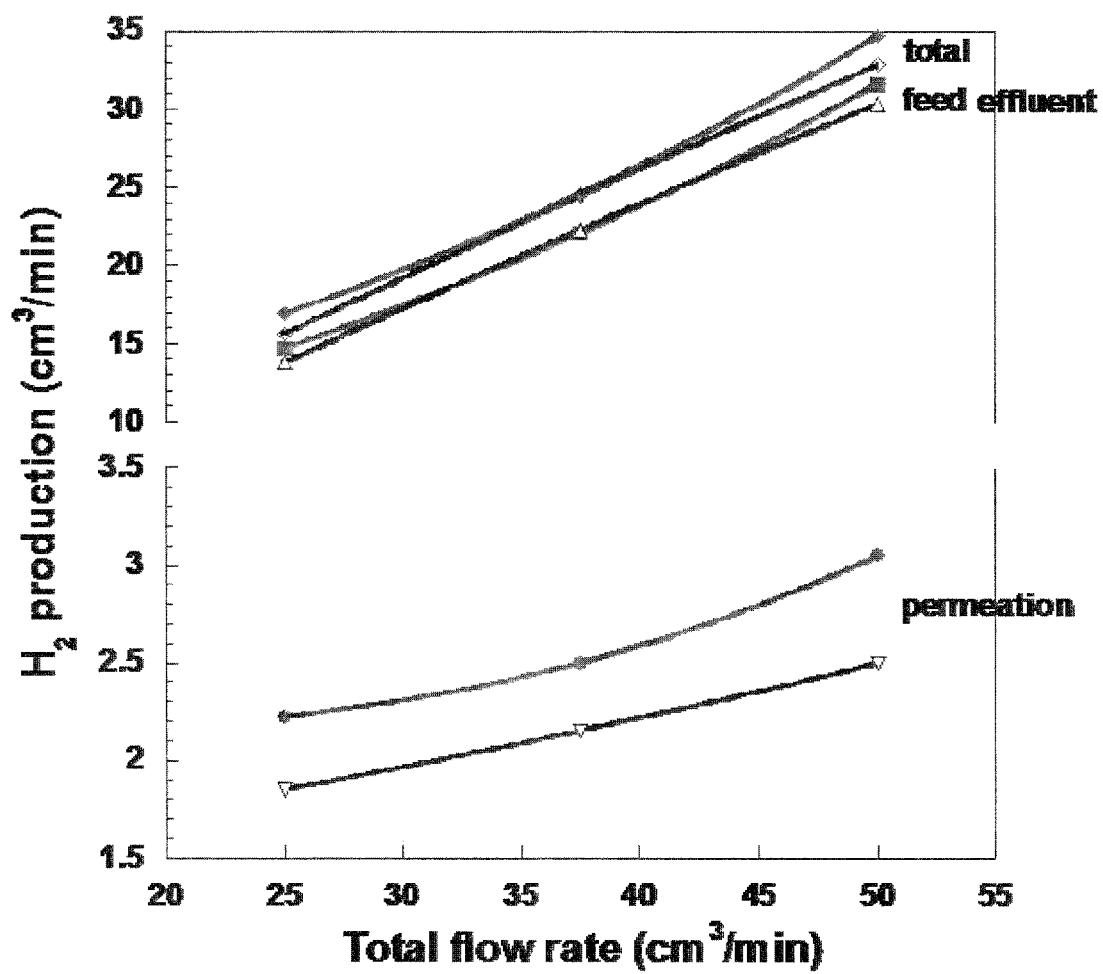

FIG. 22 is a plot of $H_2$ productions and its distribution between the feed effluent and that permeating through a $SrCe_{0.7}Zr_{0.2}Eu_{0.1}O_{3-\delta}$ on Ni—$SrCe_{0.8}Zr_{0.2}O_{3-\delta}$ proton conductive membrane from a 1/1.5 $CH_4/CO_2$ feed using a $SrCe_{0.7}Zr_{0.2}Eu_{0.1}O_{3-\delta}$ Ni—$SrCe_{0.8}Zr_{0.2}O_{3-\delta}$ proton conductive membrane according to an embodiment of the invention, where: ● $H_2$ (permeated), ▎$H_2$ (feed effluent) and ◆ (total $H_2$) at 850° C.; and ▽ $H_2$ (permeated), △ $H_2$ (feed effluent) and ○ (total $H_2$) at 850° C.

Figure 23:
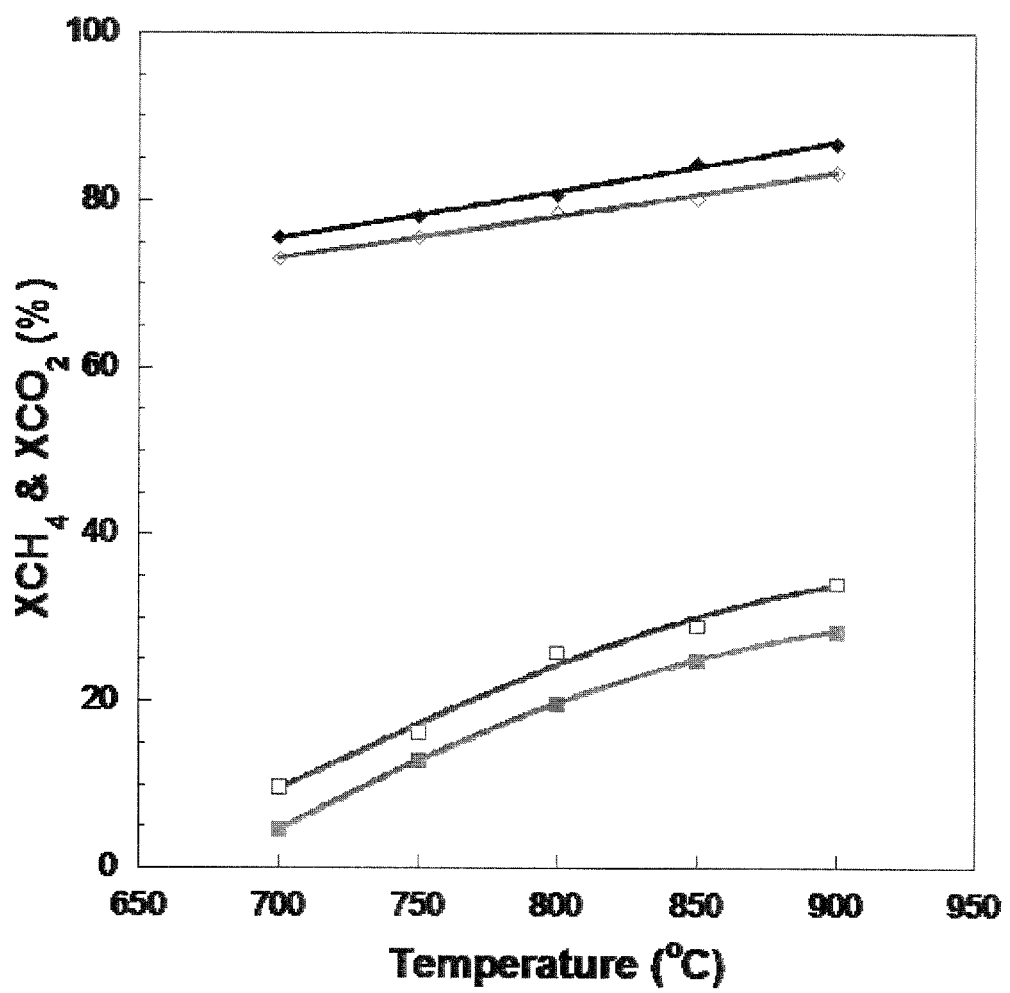

FIG. 23 is a plot of $CH_4$ (diamonds) and $CO_2$ (squares) conversions for $CH_4/CO_2/H_2O$ feed ratios of 2/1/1 (hollow symbols) and 2/1/1.5 (filled symbols) using a $SrCe_{0.7}Zr_{0.2}Eu_{0.1}O_{3-\delta}$ on Ni—$SrCe_{0.8}Zr_{0.2}O_{3-\delta}$ proton conductive membrane according to an embodiment of the invention.

Figure 24:
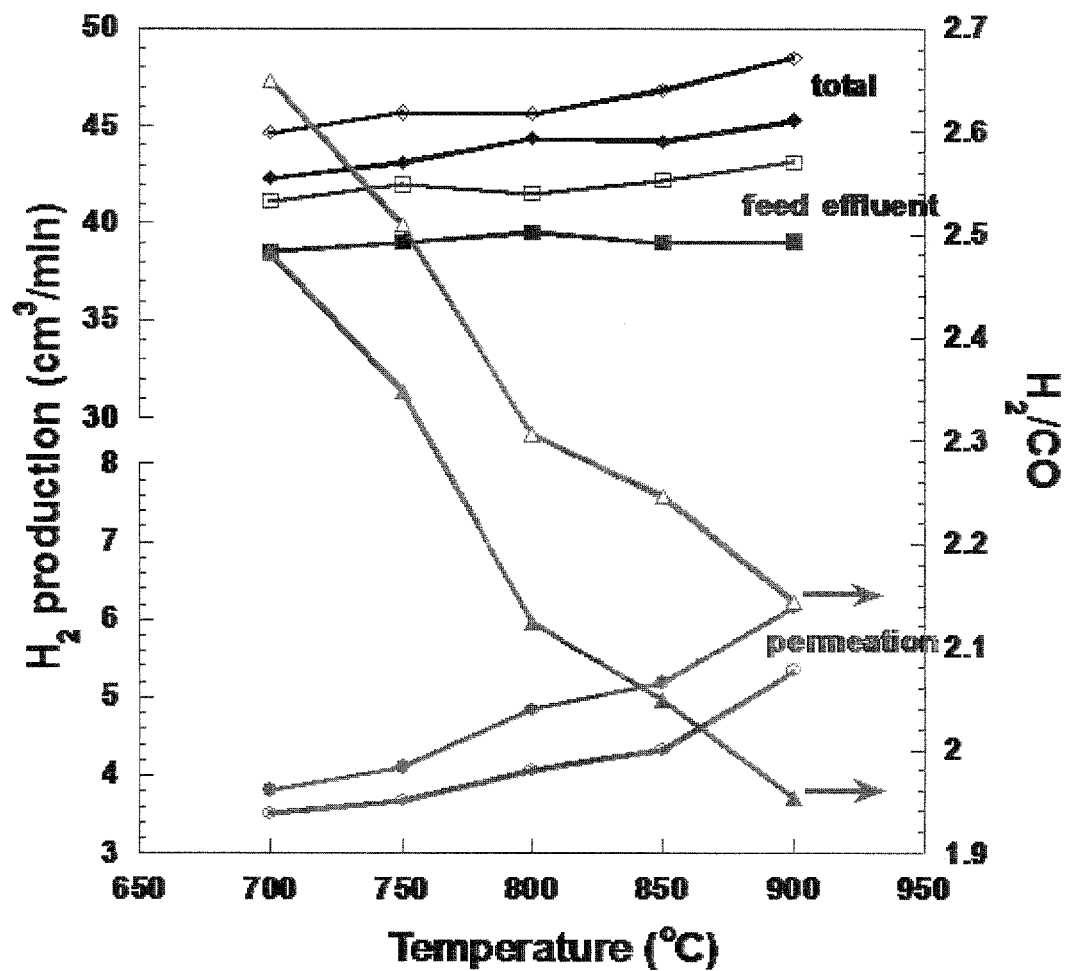

FIG. 24 is a plot of $H_2$ productions (circles (permeated), squares (feed effluent), and total (diamonds)) (left scale) and the $H_2$/CO ratio (triangles) (right scale) as a function of temperature for $CH_4/CO_2/H_2O$ feed ratios of 2/1/1 (filled symbols) and 2/1/1.5 (hollow symbols) using a $SrCe_{0.7}Zr_{0.2}Eu_{0.1}O_{3-\delta}$ on Ni—$SrCe_{0.8}Zr_{0.2}O_{3-\delta}$ proton conductive membrane according to an embodiment of the invention.

DETAILED DESCRIPTION

Embodiments of the invention are directed to Perovskite-type oxide proton conductors that are stable and can be readily fabricated as part of membranes in a form that can be used in a thermally integrated reactor where hydrogen production and separation can be carried out simultaneously at a high temperature. The novel reactor can be use to carry out hydrogen production from hydrocarbon or hydrocarbon mixture, such as CNG, or other hydrocarbons, including natural gas, coal based syngas and gasified biomass, by SMR and/or WGS reactions carried out simultaneously. In another embodiment of the invention, the membrane reactor can be used to sequestor $CO_2$ by conversion to chemical feedstocks and fuels. The novel Perovskite-type oxide is one of an $ABO_{3-d}$ type where: A is Sr, Ba, Ca, Mg, Sm, Eu, Gd, Tb, Dy, Ho, Er, Tm, Yb or combinations thereof, for example Sr, Ba, Ca, Mg or combinations thereof; and B is $Ce_{1-x-y}Zr_xM_y$ where M is at least one of Ti, V, Cr, Mn, Fe, Co, Ni, Cu, Nb, Mo, W, Pr, Nd, Pm, Sm, Eu, Gd, Tb, Dy, Ho, Er, Tm, and Yb; x is 0 to about 0.2; and y is about 0.1 to about 0.3. The inclusion of Eu, for example, provides a high $H_2$ permeation. Although examples and description, below, are directed to the inventive composition where M is Eu, it should be understood that any of the other metals or combination of these metals can be substituted for or included with Eu for the inventive oxide proton-electron conductor membranes. The inclusion of Zr stabilizes the oxide toward reaction of the oxide with CO and $CO_2$ and allows extended high temperature use of the membrane. A preferred embodiment for the novel Perovskite-type oxide is one of an $ABO_{3-d}$ type where A is Sr and B is $Ce_{1-x-y}Zr_xM_y$ where M is at least one of Ti, V, Cr, Mn, Fe, Co, Ni, Cu, Nb, Mo, W, Pr, Nd, Pm, Sm, Eu, Gd, Tb, Dy, Ho, Er, Tm, and Yb, x is 0.1 to about 0.2 and y is about 0.1 to about 0.3.

Figure 1:
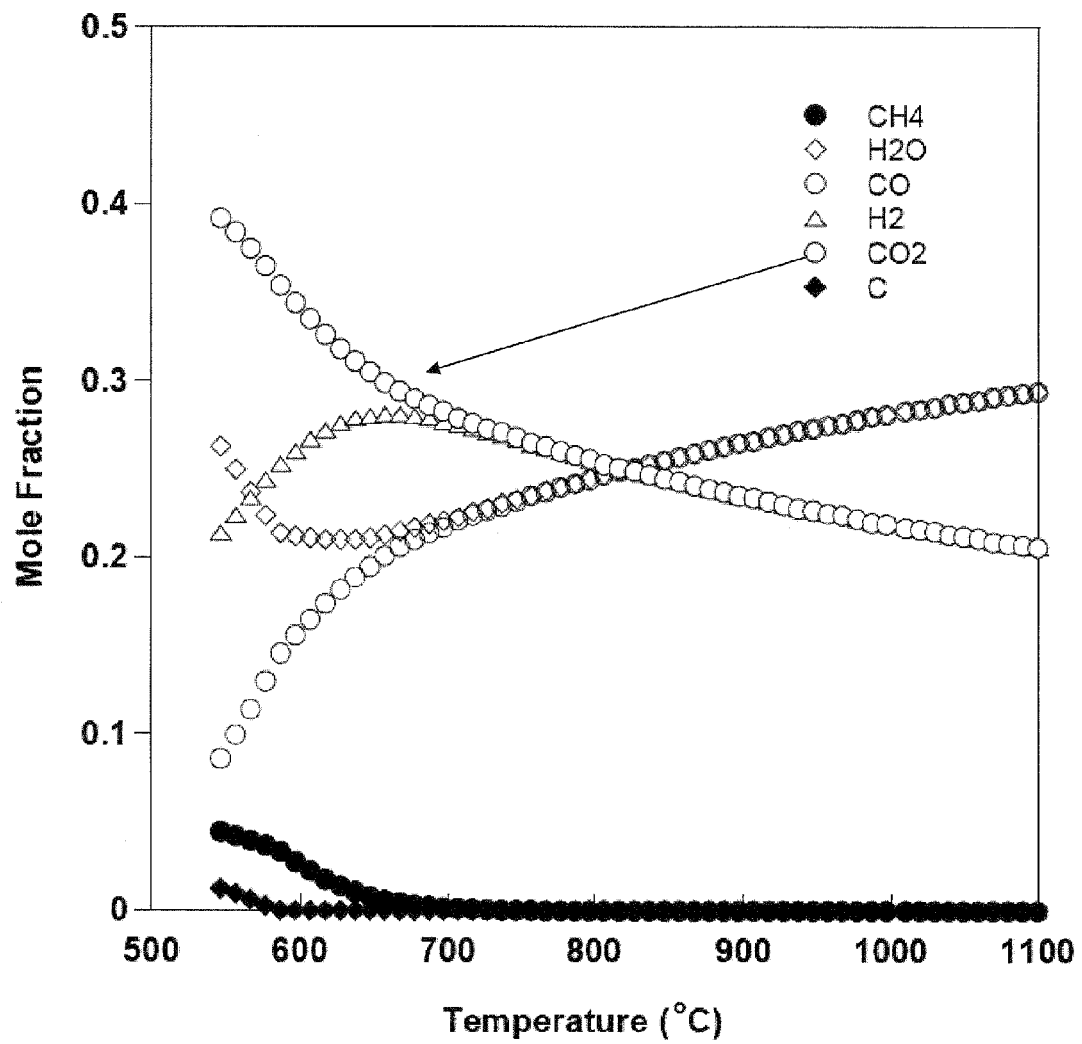
FIG. 1 is a plot of the equilibrium concentrations of reactants and products of the WGS process with a $H_2O/CO$ ratio of 1 as a function of temperature.
Figure 2:
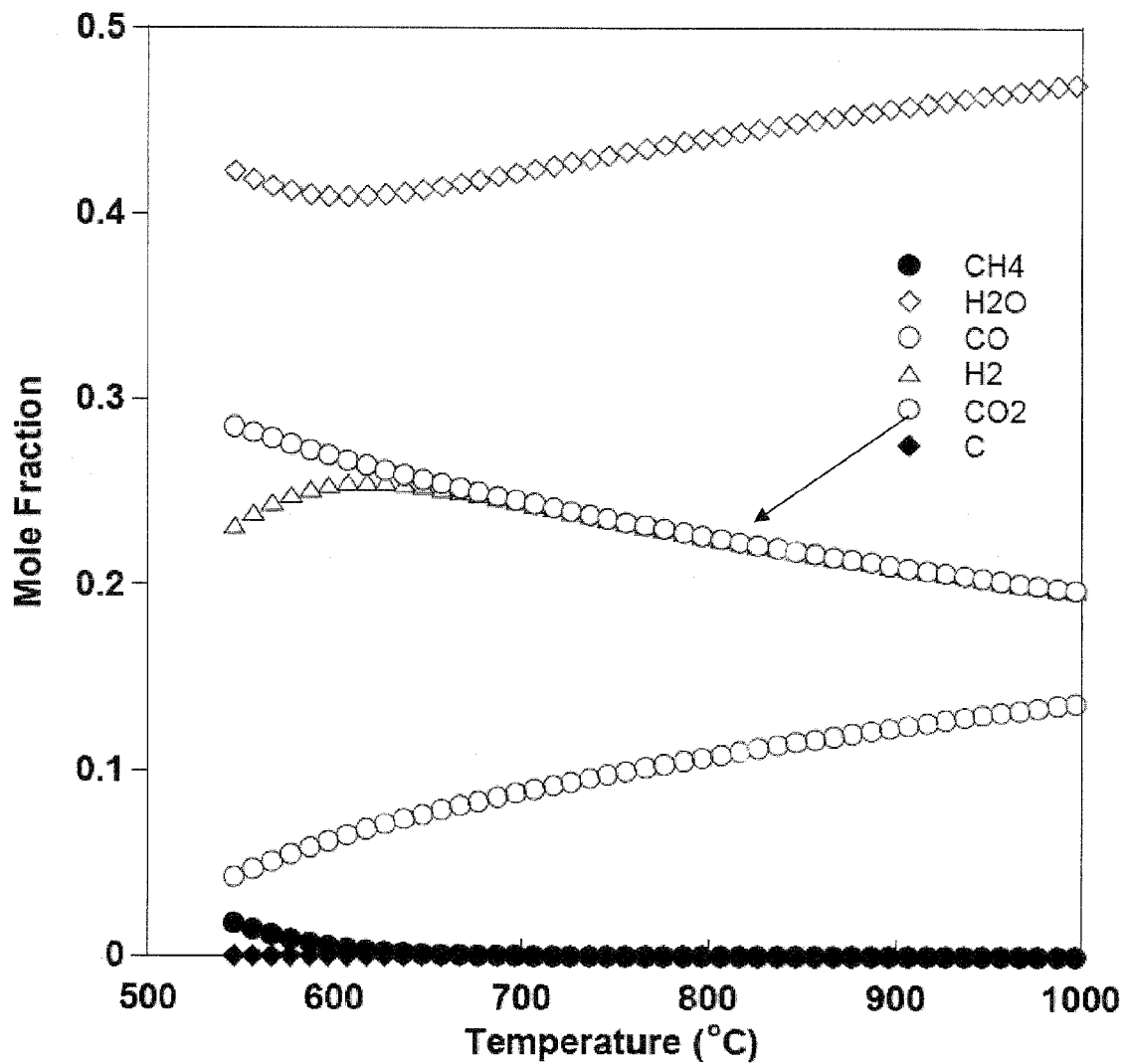
FIG. 2 is a plot of the equilibrium concentrations of reactants and products of the WGS process with a $H_2O/CO$ ratio of 2 as a function of temperature.

SMR and/or WGS processes are possible where sufficient water is employed and where the equilibrium can be shifted to higher yield by the removal of hydrogen. The inventive proton conductor enables a reactor based on a highly hydrogen selective membrane that employs a membrane material that is stable to high temperatures in the presence of the chemical species possible during the performance of these reactions. The thermodynamic considerations to establish appropriate conditions to carry out the reactions that avoid the formation of side products, such as carbon, in addition to the reagents, intermediates, and products of the net conversion of hydrocarbon and water to $H_2$ and $CO_2$ Using Thermocalc® software, the theoretical composition resulting from these equilibria was calculated at $H_2O$/CO ratios of 1 and 2, which are plotted in FIG. 1 and FIG. 2, respectively. As can be seen in these plots, high temperatures and $H_2O$/CO ratios are conducive to the inhibition of carbon formation and having minimal residual methane. As illustrated in FIG. 1, temperatures in excess of 590° C. are required to assure no carbon fowling when the $H_2O$/CO ratio would drop to as low as 1, although increasing the ratio to 2 allows the avoidance of carbon fowling at temperatures below 550° C. As indicated in FIG. 1, equilibrium methane concentrations are not effectively eliminated until a temperature of about 700° C. at a $H_2O$/CO ratio of 1. As SMR is endothermic, but entropically favorable, temperatures in excess of about 750° C. to about 1,000° C. are used.

The Perovskite-type oxide conductors for the membranes according to the invention have the structure $SrCe_{1-x-y}$ $Zr_xM_yO_{3-d}$ where M is at least one of Ti, V, Cr, Mn, Fe, Co, Ni, Cu, Nb, Mo, W, Pr, Nd, Pm, Sm, Eu, Gd, Tb, Dy, Ho, Er, Tm, and Yb, x is 0 to about 0.2 and y is about 0.1 to about 0.3, and provide the needed hydrogen flux and catalyst stability to achieve high conversions as a stable membrane when on a Ni—$SrCe_{1-z}Zr_zO_3$, where z=0.1 to 0.3 porous support for use at temperatures of about 850° C. to about 950° C. or more. This novel composition was found to be stable to the presence of $CO_2$ at high temperatures compositions. Compositions with insufficient quantities of Zr were observed to be unstable at temperatures below 900° C. Furthermore, compositions without Zr in the porous support resulted in membrane cells that crack at elevated temperatures. The perovskite-type oxide can be deposited on the support at thicknesses of about 1 to about 50 µm.

The inventive membrane uses a support that can be M'-$Sr_{1-z}M''_zCe_{1-x'-y'}Zr_{x'}M'''_{y'}O_{3-d}$, $Al_2O_3$, mullite, $ZrO_2$, $CeO_2$ or any mixtures thereof where: M' is Ni, Ti, V, Cr, Mn, Fe, Co, Ni, Cu, Nb, Mo, W, Zn, Pt, Ru, Rh, Pd, alloys thereof or mixtures thereof; M" is Ba, Ca, Mg, Sm, Eu, Gd, Tb, Dy, Ho, Er, Tm, or Yb; M''' is Ti, V, Cr, Mn, Fe, Co, Ni, Cu, Nb, Mo, W, Pr, Nd, Pm, Sm, Eu, Gd, Tb, Dy, Ho, Er, Tm, or Yb; z' is 0 to about 0.5; x' is 0 to about 0.5; y' is 0 to about 0.5; and x'+y'>0, where the support is stable under the temperatures and reaction mixtures employed with the membrane reactor. In one embodiment of the invention the support is Ni—Sr $Ce_{1-x'}Zr_{x'}O_{3-d}$, where x' is about 0.1 to about 0.3, which acts as the catalyst for the SMR and/or WGS process. Under the required conditions for performance of these processes, the presence of the Zr was found to be critical for the resistance of the membrane to deterioration and cracking. To maintain its stability, the proton-electron conductive film also requires Zr such that the loss of Zr from the support does not occur during use.

According to an embodiment of the invention, the membrane cells can be $SrCe_{1-x-y}Zr_xM_yO_{3-d}$ where M is at least one of Ti, V, Cr, Mn, Fe, Co, Ni, Cu, Nb, Mo, W, Pr, Nd, Pm, Sm, Eu, Gd, Tb, Dy, Ho, Er, Tm, and Yb, x is 0 to about 0.2 and y is about 0.1 to about 0.3, supported on Ni—$SrCe_{1-x'}Zr_{x'}O_{3-d}$, where x' is about 0.1 to about 0.3 and can be prepared by a method where the membrane coating is prepared by any method where a desired stoichiometric mixture of perovskite oxide precursors are combined. For example, a mixture of $SrCO_3$, $CeO_2$, $ZrO_2$, and $Eu_2O_3$, as uniformly dispersed fine particles, for example by ball-milling, are heated at a sufficiently high temperatures so that the oxide precursors are calcined to form the Perovskite structure. The Perovskite oxide can be ground and dispersed in a fluid, such as ethanol, to form a slurry that can then be used to coat a porous support, which can be subsequently sintered to form a dense coating on the porous support.

According to an embodiment of the invention, a porous support can be prepared by combining a mixture of NiO, $SrCe_{1-x'}Zr_{x'}O_{3-d}$, where x' is about 0.1 to about 0.3, with a fluid, which includes an aqueous or non-aqueous liquid to suspend the particles and, as needed, appropriate dispersants, plasticizers and binders. Ball-milling the mixture achieves a dispersed finely divided solid in the fluid which can then be degassed. The mixture can then be cast, for example by tape casting or other common casting methods, molded, or extruded to form a particulate ceramic green body. In one embodiment of the invention, the green body as a tape can be form into a green body tube and sintered to form the porous support.

In an embodiment of the invention, the porous support can be coated on one surface with the Perovskite-type oxide proton conductor and the coated support sintered to form the desired membrane cell. The membrane cell can be a plate, a tube, or any geometry where a surface with the coating can be segregated from sides without the coating such that the gas volume on the two sides of the membrane cell can be segregated. A tubular support can be coated on the inside or outside surface in various embodiments of the invention. The tube can be open at both ends in some embodiments of the invention, and can be closed at one end in other embodiments of the invention.

Figure 3:
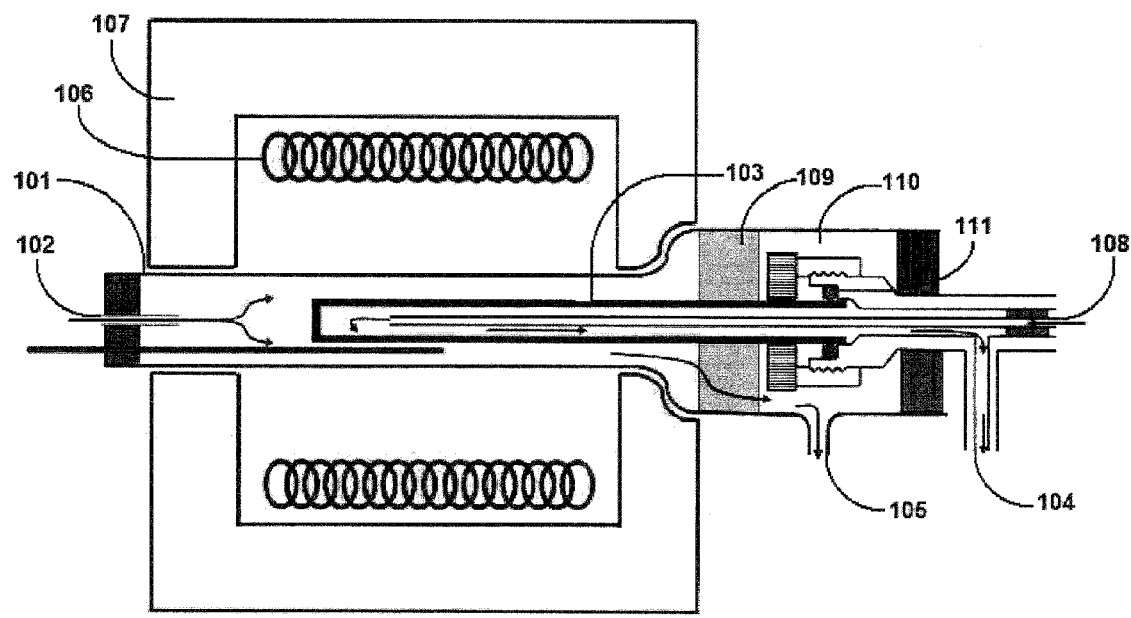
FIG. 3 is a schematic diagram of a hydrogen permeation reactor system according to an embodiment of the invention.

Many different configurations of membrane cells can be used to design hydrogen permeation reactor systems according to embodiments of the invention. An embodiment of the invention where the membrane cell is in the form of an internally proton conductor coated closed end tube is illustrated in FIG. 3. The reactor systems require a housing 101 to contain and direct gases and allowing the separation of the produced hydrogen comprising gas from the reactant gas stream comprising a SMR and/or WGS reaction mixture, such that the methane and/or other hydrocarbon and water vapor mixture is introduced to the porous Ni—$SrCe_{1-x'}Zr_{x'}O_{3-d}$, where x' is about 0.1 to about 0.3, side of the membrane cell 103 and isolated from the hydrogen comprising gas on the Perovskite-type oxides proton conductor coating side of the membrane cell. The reactor system has an inlet 102 for the reacting gas mixture and an outlet for the hydrogen comprising product gas 104 and an outlet for the other reactor product comprising gas 105. A means to heat the membrane cell 106 can be provided if desired, although, in general, sufficient heat is generated in the process such that such a heater is not required. In this embodiment, illustrated as configured for experimental purposes, a means of heating 106 is provided within a furnace 107 and the housing 101 is quartz and essentially tubular in structure. An inlet 108 for a sweeping carrier gas, such as helium, can be used to promote the removal of the hydrogen that crosses the tubular membrane cell. In this embodiment the tube extends through the housing 101 in a manner where the volume on the outside of the tube 103, on the film free surface of the membrane, is where an inlet 102 allows the intake of hydrocarbon and water and $CO_2$ comprising gases to be isolated from the hydrogen comprising gas removed from the inside of the membrane tube 103. Although illustrated as a tubular reactor, those skilled in the art can appreciate that the reactor can have other shapes, forms and designs. The housing need not be quartz but can be any material that has sufficient properties at the temperature where the reactor is employed. For example, the housing can be a metal or metal alloy, such as steel or can be a ceramic. To control the reaction, generally the reactor system also, but not necessarily, includes valves, temperature controlling means, and other devices to monitor and/or control the variables of gas input, output, pressure and temperature to optimize or otherwise control the rate of hydrogen formation.

In another embodiment of the invention, the proton conducting membranes can be employed to reform $CO_2$ with hydrogen rich hydrocarbon gases, such as $CH_4$, to produce CO and $H_2$. The product CO and $H_2$ can be converted through a Fischer-Tropsch process to chemical feedstocks and liquid fuels. In this manner $CO_2$ can be sequestered along with $CH_4$, a more potent green house gas, at point sources that generate large quantities of $CO_2$ and/or $CH_4$.

Materials and Methods

Stability of Zr Containing Perovskite Oxides $SrCe_{0.9}Eu_{0.1}O_{3-d}$ and $SrCe_{0.7}Zr_{0.2}Eu_{0.1}O_{3-d}$ samples were prepared by a solid-state reaction where $SrCO_3$, $CeO_2$, $ZrO_2$ and $Eu_2O_3$ in the desired stoichiometric ratio were ball-milled for at least 24 h and calcined for 10 hours at 1300° C. in air. The powders were ground and Perovskite structures were confirmed by X-ray diffraction. All samples were exposed to dry and wet hydrogen atmospheres for 24 hours and their X-ray diffraction patterns were determined after each exposure. Conductivity was measured under wet and dry $H_2$ atmospheres and multiple temperatures for each sample. Pellets were coated with Pt-paste (Englehard 6926) and heated to 1,000° C. for 1 hour. Conductivity measurements were performed using a Solartron 1260 Impedance Analyzer in the frequency range of 0.1 Hz to 1 MHz.

Figure 4:
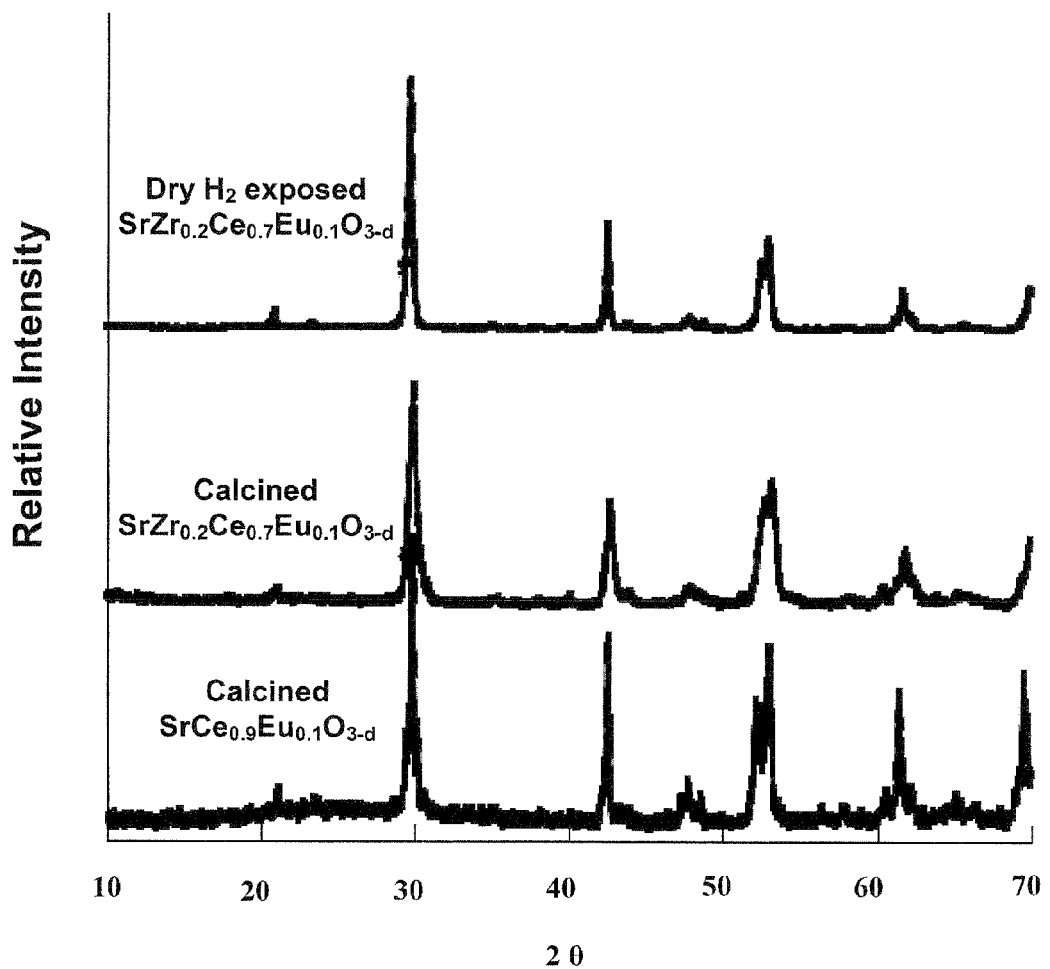
FIG. 4 shows powder X-ray patterns for calcined $SrCe_{0.9}Eu_{0.1}O_{3-d}$ and calcined $SrCe_{0.7}Zr_{0.2}Eu_{0.1}O_{3-d}$, according to an embodiment of the invention, before and after exposure to dry hydrogen at 900° C. for 24 hour.

FIG. 4 displays powder X-ray patterns of calcined $SrCe_{0.9}Eu_{0.1}O_{3-d}$ and calcined $SrCe_{0.7}Zr_{0.2}Eu_{0.1}O_{3-d}$ before and after exposure to dry hydrogen at 900° C. for 24 hour. The higher angle peak positions of calcined $SrCe_{0.7}Zr_{0.2}Eu_{0.1}O_{3-d}$, in comparison to the calcined $SrCe_{0.9}Eu_{0.1}O_{3-d}$ peaks, reflect a decreased perovskite unit cell volume with Zr substitution. After heating in dry hydrogen, the X-ray pattern of $SrCe_{0.7}Zr_{0.2}Eu_{0.1}O_{3-d}$ does not change, indicating no secondary phase formation, and stability under these conditions.

Figure 5:
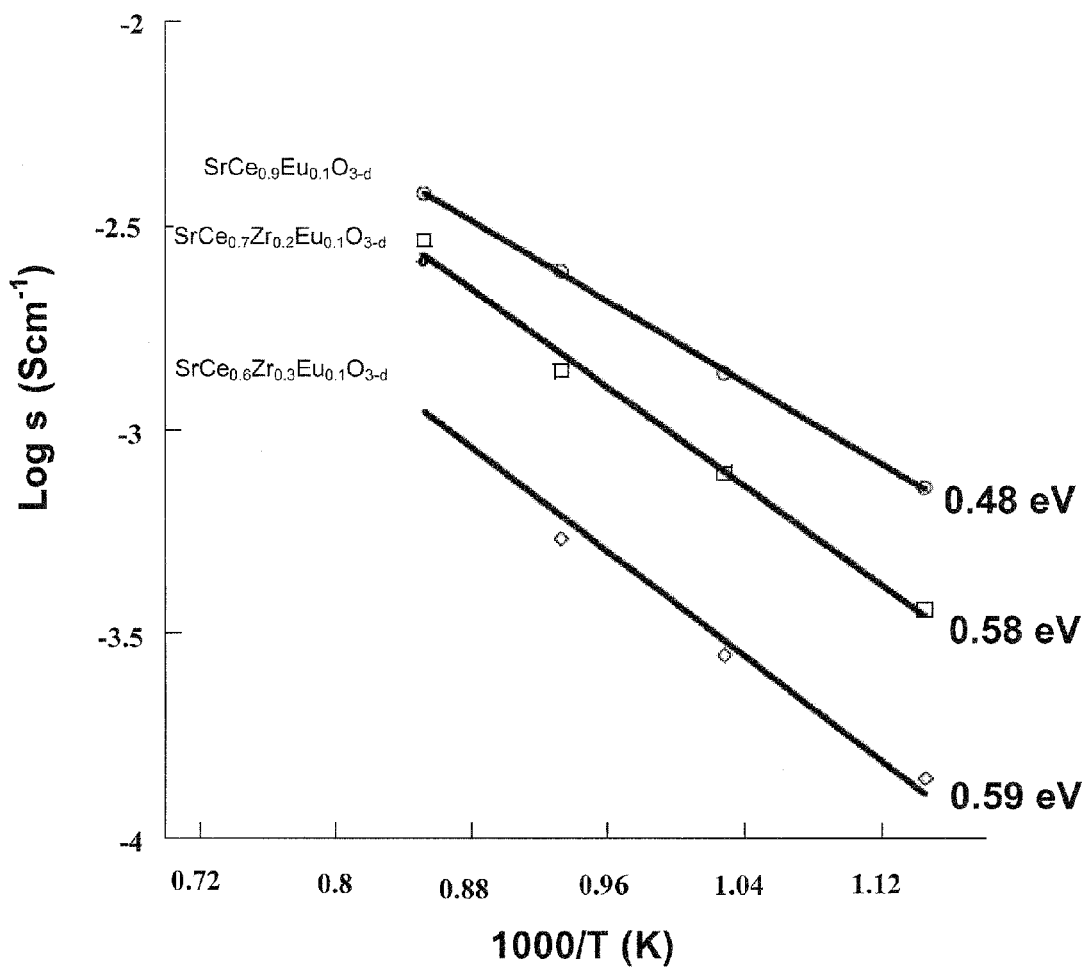
FIG. 5 is a plot of total conductivity for $SrCe_{0.9}Eu_{0.1}O_{3-d}$ and $SrCe_{0.7}Zr_{0.2}Eu_{0.1}O_{3-d}$ and $SrCe_{0.6}Zr_{0.3}Eu_{0.1}O_{3-d}$, according to an embodiment of the invention, under pure $H_2$ atmosphere as a function of temperature.
Figure 6:
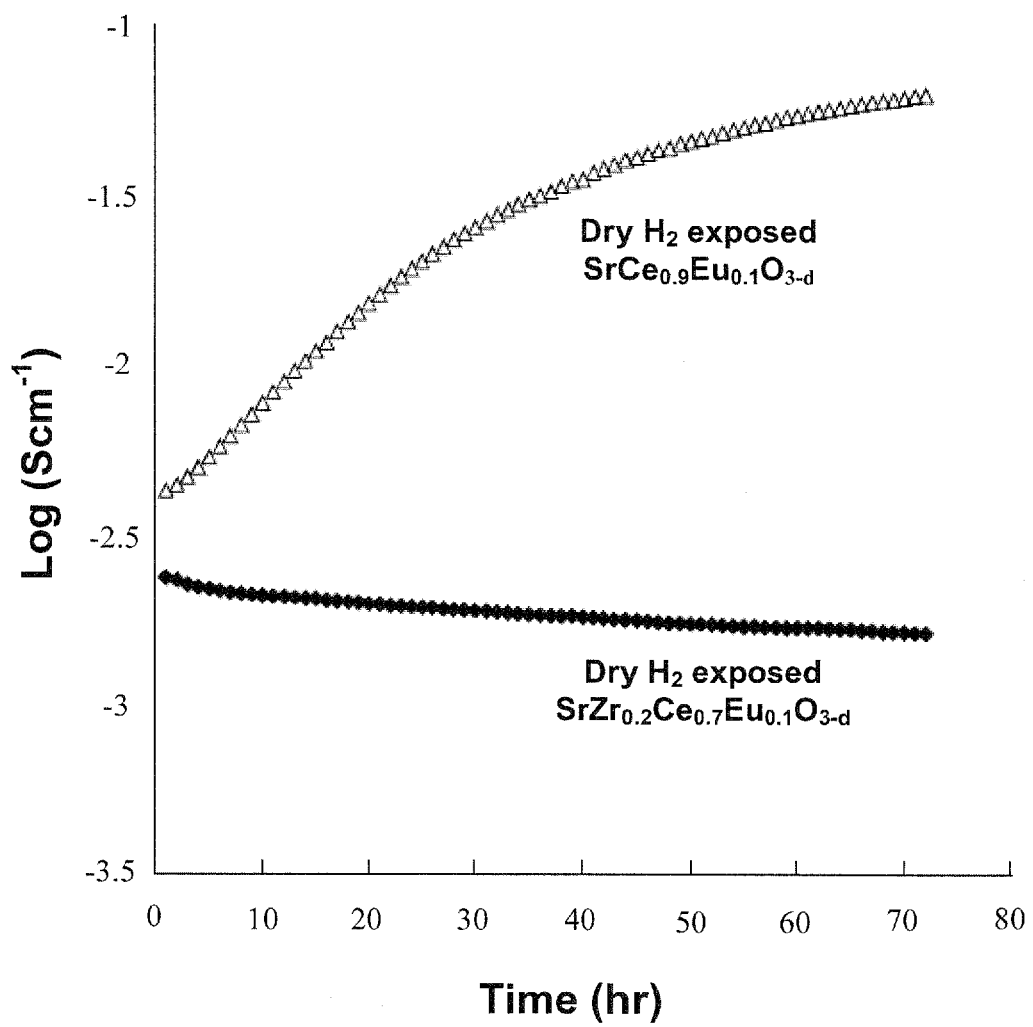
FIG. 6 is a plot of conductivity of $SrCe_{0.9}Eu_{0.1}O_{3-d}$ and $SrZr_{0.2}Ce_{0.7}Eu_{0.1}O_{3-d}$, according to an embodiment of the invention, under a dry hydrogen atmosphere at 900° C. over 5 days.

Total conductivity was measured for $SrCe_{0.9}Eu_{0.1}O_{3-d}$, $SrCe_{0.7}Zr_{0.2}Eu_{0.1}O_{3-d}$ and $SrCe_{0.6}Zr_{0.3}Eu_{0.3}O_{3-d}$ under pure $H_2$ atmospheres, as shown in FIG. 5. $SrCe_{0.9}Eu_{0.1}O_{3-d}$ shows higher conductivity than Zr substituted samples and the conductivity decreases with Zr content. The conductivity of $SrCe_{0.9}Eu_{0.1}O_{3-d}$ and $SrZr_{0.2}Eu_{0.1}O_{3-d}$ under a dry hydrogen atmosphere at 900° C. was measured for 5 days, as shown in FIG. 6. The $SrCe_{0.9}Eu_{0.1}O_{3-d}$ conductivity increases with time due to phase decomposition. Although the total conductivity of $SrCe_{0.7}Zr_{0.2}Eu_{0.1}O_{3-d}$ is less than that of $SrCe_{0.9}Eu_{0.1}O_{3-d}$, a greater stability under dry hydrogen atmosphere was observed for $SrCe_{0.7}Zr_{0.2}Eu_{0.1}O_{3-d}$.

Comparative Stability of Zr Containing Supports

Ni—$SrCeO_3$ tubular type supports containing and free of Zr with $SrCe_{0.9}Eu_{0.1}O_{3-d}$ hydrogen membrane thin films were prepared by tape casting and rolling techniques. $SrCeO_3$ was prepared by a conventional solid state reaction method from $SrCO_3$ (99.9%) and $CeO_2$ powder (99.9%) as starting materials. $SrCe_{0.9}Eu_{0.1}O_{3-d}$ powder was synthesized by a citrate process, using 1 to 2 molar ratios of the total metal nitrates to citric acid, which displayed no secondary phase formation at a relatively low calcining temperature of 1300° C. in air. After presintering the support at 1100° C. for 10 hours, $SrCe_{0.9}Eu_{0.1}O_{3-d}$ was coated inside the support by a dip coating method. Membrane thickness was varied by depositing different numbers of coatings. The membrane tube was sintered at 1450° C. for 5 hours.

The hydrogen permeation measurement was conducted by installing the tubular hydrogen membrane cell in a high temperature reactor apparatus, as shown in FIG. 3. The feed side of the membrane cell was exposed to $H_2$ (99.999%) diluted to a desired concentration with Ar (99.999%) at a 20 $cm^3$/min total flow rate. To achieve a wet gas flow, the feed gas was passed through a water bubbler at 25° C. resulting in a feed gas with 3 volume percent water vapor. The opposite (sweep) side of the membrane was swept with He at 20 $cm^3$/min. SMR conditions were achieved combining a $CH_4$ gas with 8% water vapor in Ar. The compositions of permeated gases on the sweep side were measured using a mass spectrometer (Dycor QuadLink IPS Quadrupole Gas Analyzer).

Figure 7:
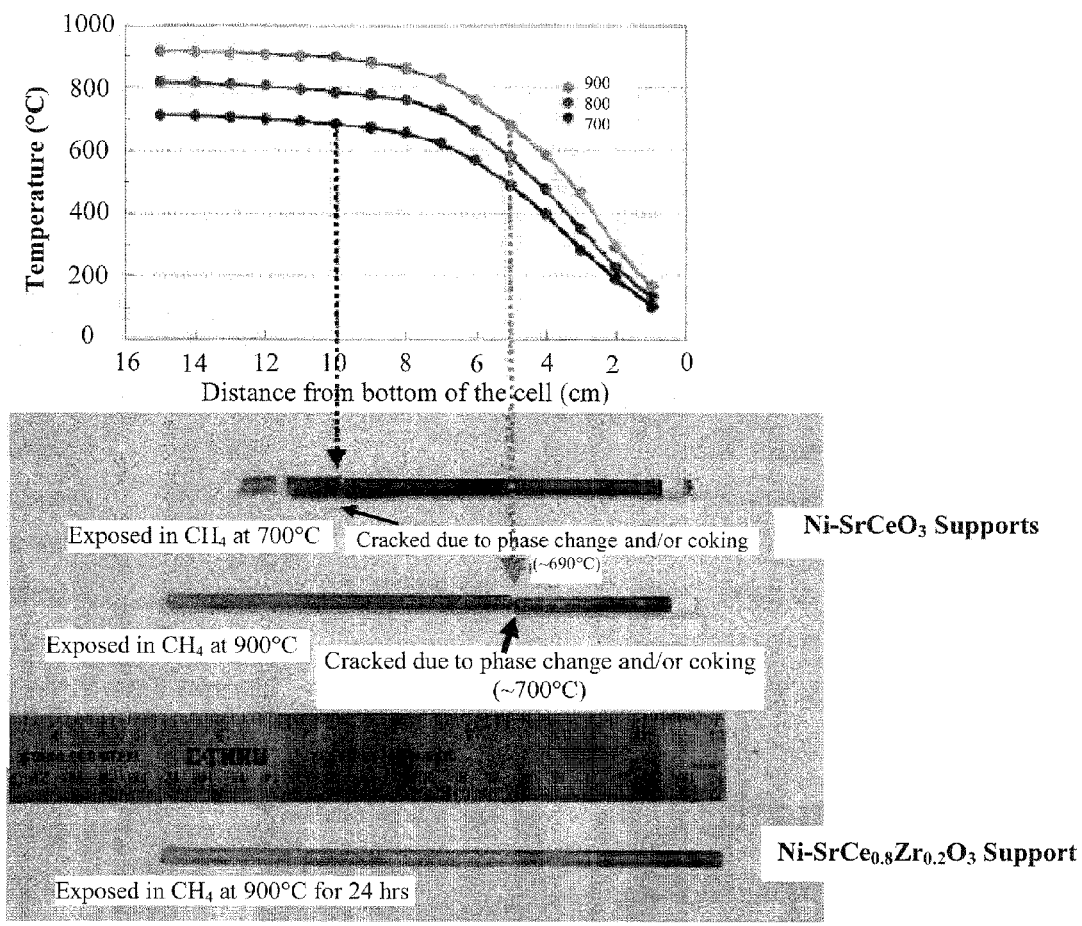
FIG. 7 is a photograph of a comparative $SrCe_{0.9}Eu_{0.1}O_{3-d}$ on $Ni\text{—}SrCeO_3$ hydrogen membrane cell and a photograph of a $SrCe_{0.9}Eu_{0.1}O_{3-d}$ on $Ni\text{—}SrCe_{0.8}Zr_{0.2}O_3$ hydrogen membrane cell, according to an embodiment of the invention, after exposure to methane with 8% steam, and correlated to a plot of the temperature profile of the temperature of the membrane cell.

The phase stability in a $CO/CO_2$ atmosphere of Ni—$SrCe_{0.8}Zr_{0.2}O_3$ supports was compared with Ni—$SrCeO_3$ supports. FIG. 7 shows the $SrCe_{0.9}Eu_{0.1}O_{3-d}$ on Ni—$SrCeO_3$ and $SrCe_{0.9}Eu_{0.1}O_{3-d}$ on Ni—$SrCe_{0.8}Zr_{0.2}O_3$ hydrogen membrane cells after exposure to methane with 8% steam. No physical cracking of the membrane cells occurred to the $SrCe_{0.9}Eu_{0.1}O_{3-d}$ on Ni—$SrCe_{0.8}Zr_{0.2}O_3$ hydrogen membrane cell, unlike $SrCe_{0.9}Eu_{0.1}O_{3-d}$ on Ni—$SrCeO_3$ which cracks under these conditions.

Figure 9:
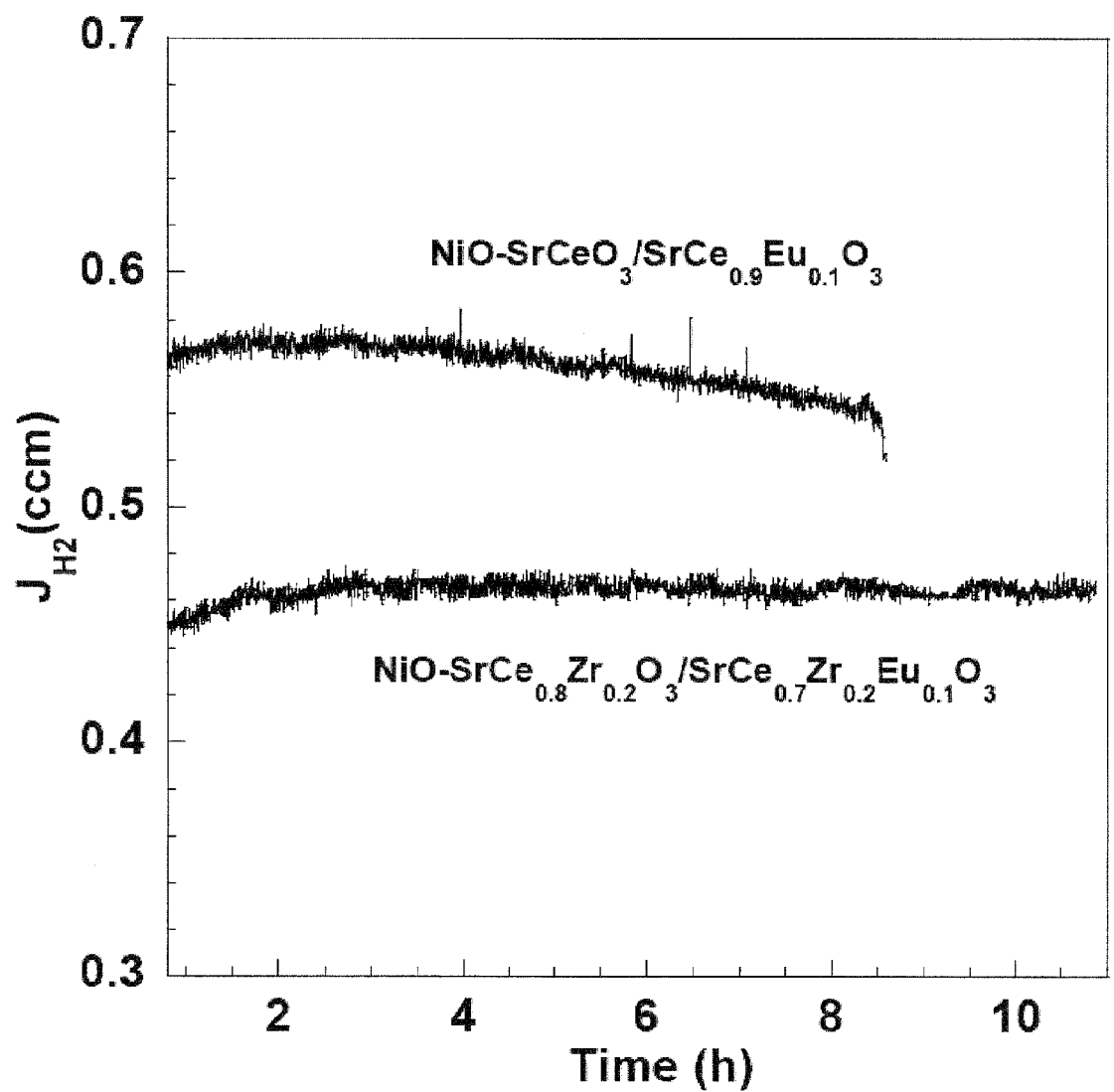
FIG. 9 is a plot of the hydrogen flux for a comparative $SrCe_{0.9}Eu_{0.1}O_{3-d}$ on $Ni\text{—}SrCeO_3$ hydrogen membrane cell and $SrCe_{0.7}Zr_{0.2}Eu_{0.1}O_{3-d}$ on $Ni\text{—}SrCe_{0.8}Zr_{0.2}O_3$ hydrogen membrane cell, according to an embodiment of the invention, with 5 volume % CO and 3 volume % $H_2O$ at 900° C. as a function of time.

FIG. 9 shows the hydrogen flux through the tubular-type $SrCe_{0.9}Eu_{0.1}O_{3-d}$ on Ni—$SrCeO_3$ hydrogen membrane cell with a $SrCe_{0.9}Eu_{0.1}O_{3-d}$ thickness of 50 μm and the hydrogen flux through the tubular-type $SrCe_{0.7}Zr_{0.2}Eu_{0.1}O_{3-d}$ on Ni—$SrCe_{0.8}Zr_{0.2}O_3$ hydrogen membrane cell with a $SrCe_{0.7}Zr_{0.2}Eu_{0.1}O_{3-d}$ thickness of 50 μm. As shown in FIG. 9, no flux degradation was observed for the $SrCe_{0.7}Zr_{0.2}Eu_{0.1}O_{3-d}$ on Ni—$SrCe_{0.8}Zr_{0.2}O_3$ hydrogen membrane cell. In contrast, the $SrCe_{0.9}Eu_{0.1}O_{3-d}$ on Ni—$SrCeO_3$ hydrogen membrane cell exhibited a significant decrease in flux with time. Degradation of the hydrogen permeation flux ultimately limits the use of such membrane cells.

Stability of Membrane Cells with Zr in the Substrate and Coating

A Ni—$SrCe_{0.8}Zr_{0.2}O_{3-d}$ tubular substrate was fabricated by tape casting method followed by a rolling process. $SrCe_{0.7}Zr_{0.2}Eu_{0.1}O_{3-d}$ powder was synthesized by a solid state reaction method and coated to the inner side of the substrate. The membrane cell's hydrogen permeability was measured with the feed side of membrane exposed to various proportions of $H_2$ with Ar and 3% $H_2O$ at a total flow rate of 20 $cm^3$/min where the sweep side of the membrane was exposed to 20 $cm^3$/min He. The permeated gases were analyzed using a mass spectrometer (Q100MS Dycor QuadLink).

Figure 8:
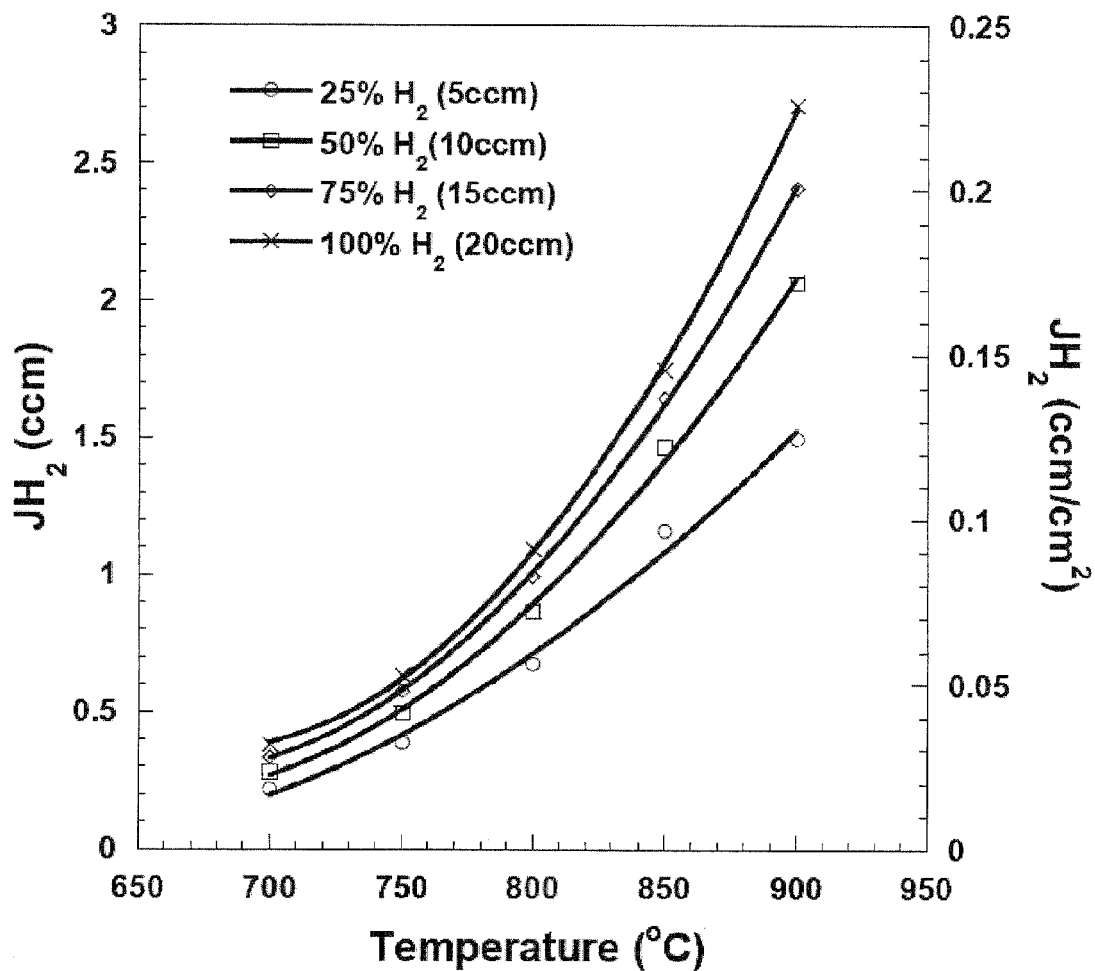
FIG. 8 is a plot of hydrogen flux for 50 μm thick $SrCe_{0.7}Zr_{0.2}Eu_{0.1}O_{3-d}$ on $Ni\text{—}SrCe_{0.8}Zr_{0.2}O_{3-d}$ membrane cells, according to an embodiment of the invention, at various hydrogen partial pressures as a function of temperature.

FIG. 8 is a plot of the hydrogen permeation of $SrCe_{0.7}Zr_{0.2}Eu_{0.1}O_{3-d}$ on Ni—$SrCe_{0.8}Zr_{0.2}O_{3-d}$ membrane cells. Hydrogen permeation flux increases with increasing temperature and hydrogen partial pressure. A hydrogen permeation flux of 0.225 ml $cm^{-2}$ $min^{-1}$ was achieved at 900° C. using 20 ccm $H_2$ as the feed gas. FIG. 9 shows the hydrogen flux versus time for hydrogen with 5 volume % CO and 3 volume % $H_2O$ at 900° C. The hydrogen flux decreased with time for a $SrCe_{0.9}Eu_{0.1}O_{3-d}$ on Ni—$SrCeO_3$, where an 8% drop was observed over 8 hours. In contrast the hydrogen flux was stable for the $SrCe_{0.7}Zr_{0.2}Eu_{0.1}O_{3-d}$ on Ni—$SrCe_{0.8}Zr_{0.2}O_{3-d}$ membrane cell.

Tubular Membrane Cells $SrCe_{0.8-x}Zr_{0.2}Eu_xO_{3-d}$ (x=0.1, 0.15 and 0.2) on Ni—$SrCe_{0.8}Zr_{0.2}O_3$ hydrogen membrane cells were prepared by a tape casting and rolling technique. $SrCe_{0.8}Zr_{0.2}O_3$ powder was prepared by a conventional solid state reaction method from $SrCO_3$ (99.9%), $ZrO_2$ (99.9%) and $CeO_2$ powder (99.9%). The $SrCe_{0.8-x}Zr_{0.2}Eu_xO_{3-d}$ (x=0.1, 0.15 and 0.2) powders were synthesized by solid state reactions. After presintering the support at 1100° C. for 10 hrs, $SrCe_{0.8-x}Zr_{0.2}Eu_xO_{3-d}$ (x=0.1, 0.15 and 0.2) was coated inside the support by a slurry coating method. Membrane thickness was varied by the number of coatings applied. The membrane cell was subsequently sintered at 1450° C. for 5 hours.

For the hydrogen permeation measurement, the tubular type hydrogen membrane cell was installed in a high temperature reactor apparatus as shown in FIG. 3. The feed side of the membrane cell was exposed to $H_2$ (99.999%) diluted to the desired concentration using Ar (99.999%) at a flow rate of 20 $cm^3$/min. A wet gas flow was formed by passing the feed gas through a water bubbler at 25° C. resulting in a 3 vol % water vapor gas mixture. The sweep side was flushed with He at 20 $cm^3$/min. The compositions of permeated gases on the sweep side were measured using a mass spectrometer (Dycor QuadLink IPS Quadrupole Gas Analyzer).

$SrCe_{1-x}Eu_xO_{3-d}$ (x=0.1, 0.15 and 0.2) on Ni—$SrCeO_3$ hydrogen membrane cells were investigated for hydrogen separation under SMR conditions. During the permeation test of $SrCe_{0.9}Eu_{0.1}O_{3-d}$ on Ni—$SrCeO_3$ hydrogen membrane cells, cracking occurred at about 700° C. regions, as shown in FIG. 7. The crack occurred under the conditions where a phase change of $SrCeO_3$ in $CO/CO_2$ atmosphere and coking in SMR at a ratio exceeding 0.6 of $CH_4/H_2O$ is possible. The support materials and the fabrication process of the tubular-type hydrogen membrane cells were augmented by substitution of Zr onto Ce-site. Although permeation flux decreases by Zr substitution, continuous stable flux and chemical stability under $CO/CO_2$ condition was achieved.

Figure 10:
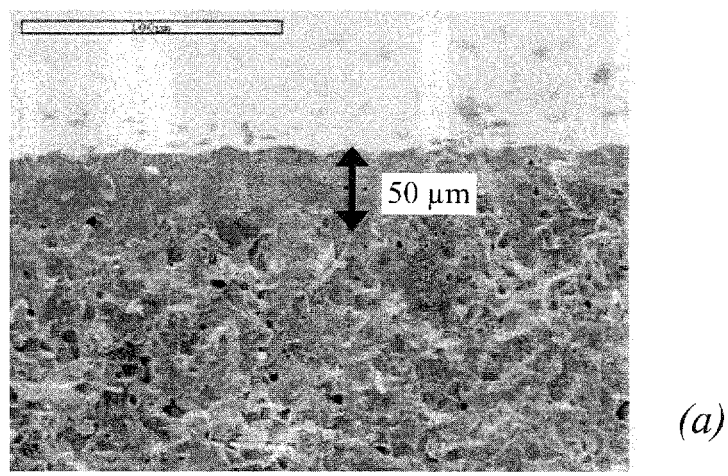
FIG. 10 is (a) an SEM image and (B) the hydrogen permeation flux for various hydrogen partial pressures for 50 μm thick $SrCe_{0.7}Zr_{0.2}Eu_{0.1}O_{3-d}$ on $Ni\text{—}SrCe_{0.8}Zr_{0.2}O_3$ membrane cells, according to an embodiment of the invention, at various temperatures.
Figure 10:
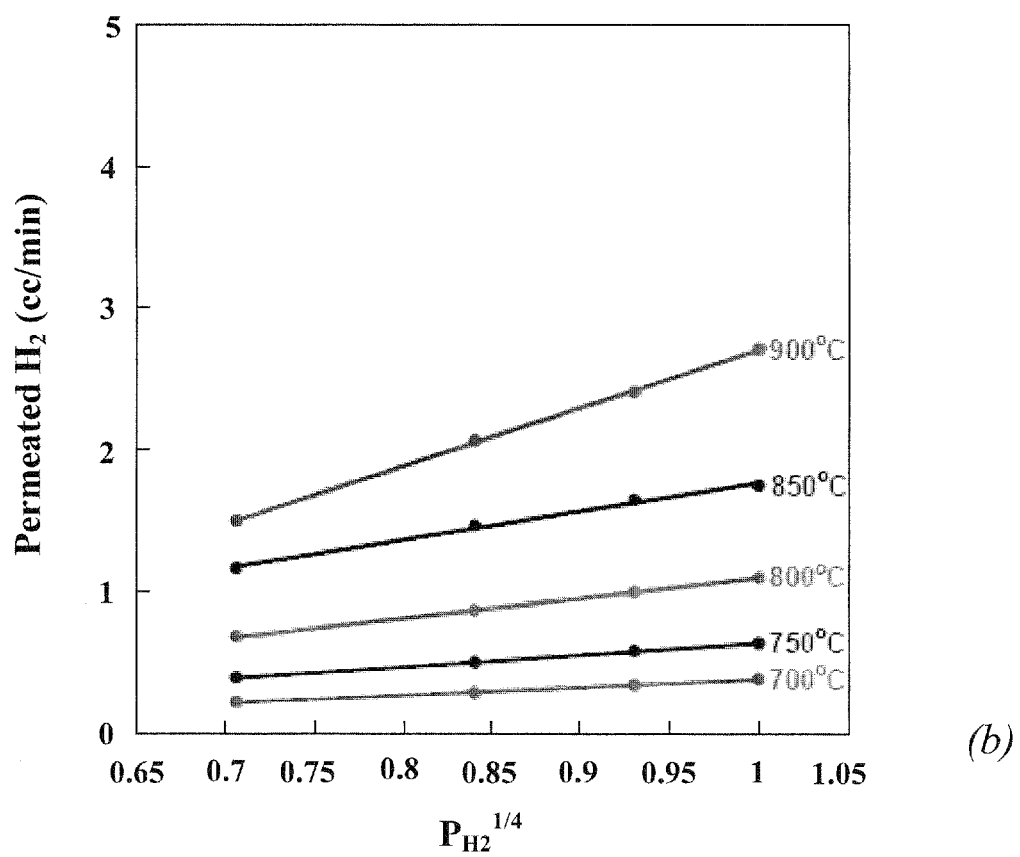
Figure 11:
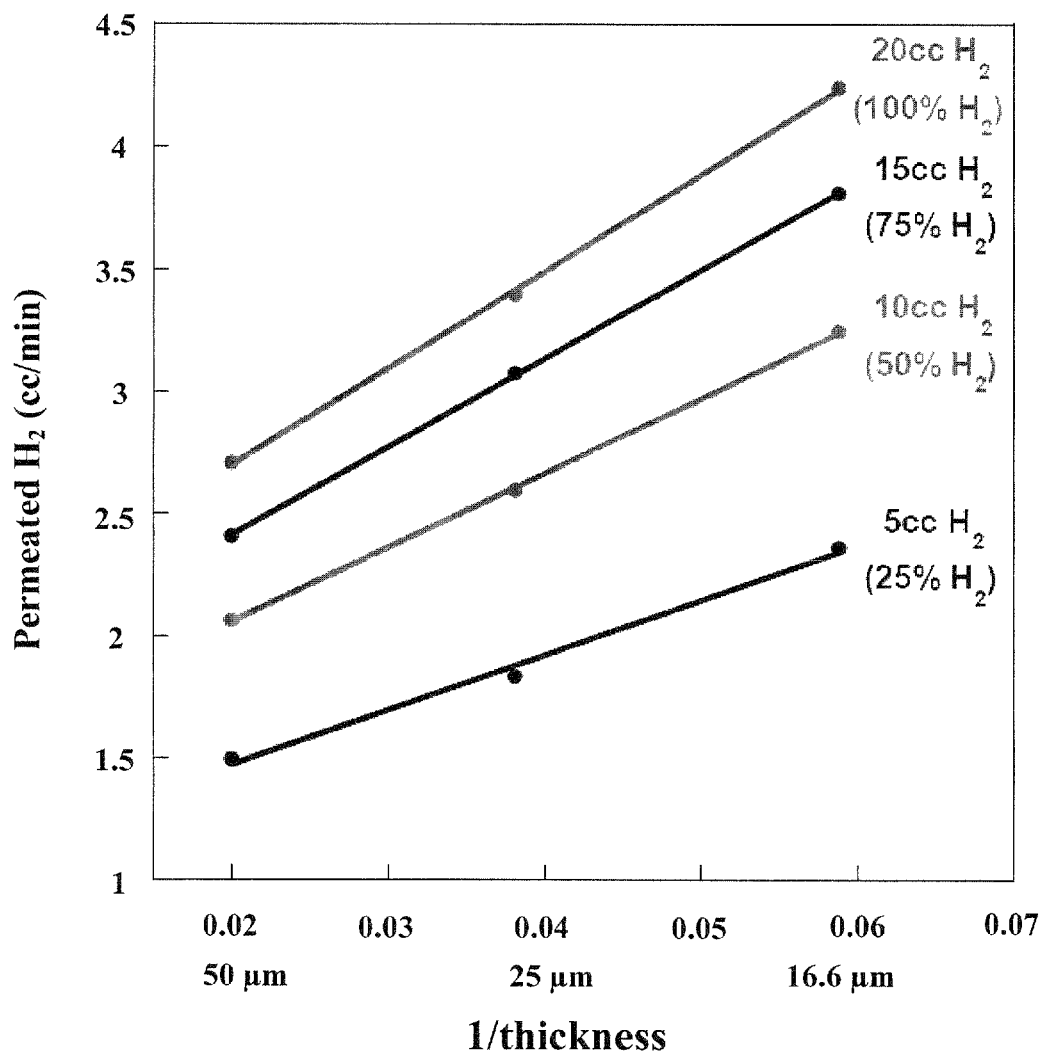
FIG. 11 is a plot of the hydrogen permeation flux for $SrCe_{0.7}Zr_{0.2}Eu_{0.1}O_{3-d}$ d on $Ni\text{—}SrCe_{0.8}Zr_{0.2}O_3$ coatings of various thicknesses, according to an embodiment of the invention, at various hydrogen contents with 3% humidity.

FIG. 10(a) shows a SEM image and FIG. 10(b) is a plot of the hydrogen permeation flux as a function of the hydrogen partial pressure for 50 μm thick $SrCe_{0.7}Zr_{0.2}Eu_{0.1}O_{3-d}$ on $Ni$—$SrCe_{0.8}Zr_{0.2}O_3$ membrane cells at various temperatures. The hydrogen flux through the $SrZr_{0.2}Ce_{0.7}Eu_{0.1}O_{3-d}$ membrane was proportional to $[P_{H2}]^{1/4}$, agreeing well with the Norby and Larring's model. This hydrogen flux increases with temperature for all partial pressures of hydrogen. $SrCe_{0.8-x}Zr_{0.2}Eu_xO_{3-\delta}$ (x=0.1, 0.15 and 0.2) hydrogen membrane thickness was dependant upon the number of coating applied to the support. The permeation flux for $SrCe_{0.7}Zr_{0.2}Eu_{0.1}O_{3-\delta}$ on $Ni$—$SrCe_{0.8}Zr_{0.2}O_3$ hydrogen membrane cells is similar to that of $SrCe_{0.9}Eu_{0.1}O_{3-\delta}$ on $Ni$—$SrCeO_3$ hydrogen membrane cell and, likewise, shows linearly increased hydrogen permeation flux with decreases in the membrane thicknesses, as shown in FIG. 11, according to Wagner's equation:

$$J_{OH_O^\bullet} = -\frac{1}{L}\left[\frac{RT}{4F^2}\int_{P'_{O_2}}^{P''_{O_2}}\sigma_t t_{OH_O^\bullet} t_{V_O^{\bullet\bullet}} d(\ln P_{O_2}) + \frac{RT}{2F^2}\int_{P'_{H_2}}^{P''_{H_2}}\sigma_t t_{OH_O^\bullet}(t_{V_O^{\bullet\bullet}} + t_{e'}) d(\ln P_{H_2})\right]$$

Figure 12:
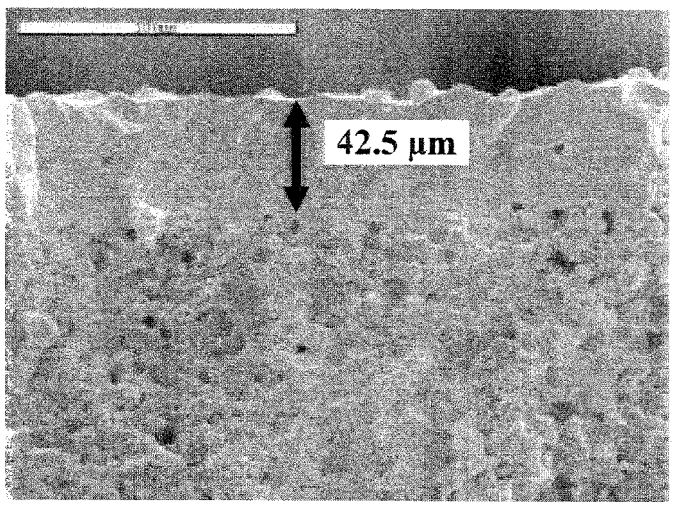
FIG. 12 are SEM images of (a) 42.5 μm, (b) 30 μm and (c) 20 μm thick $SrCe_{0.65}Zr_{0.2}Eu_{0.15}O_{3-d}$ hydrogen membrane coatings according to an embodiment of the invention on a porous support.
Figure 12:
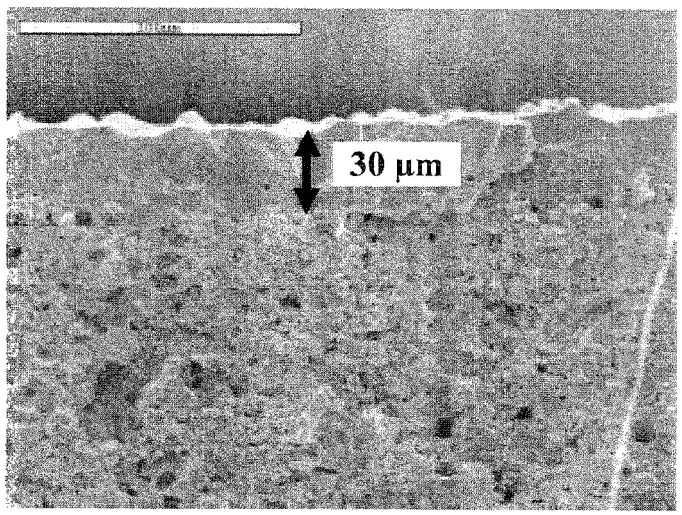
Figure 12:
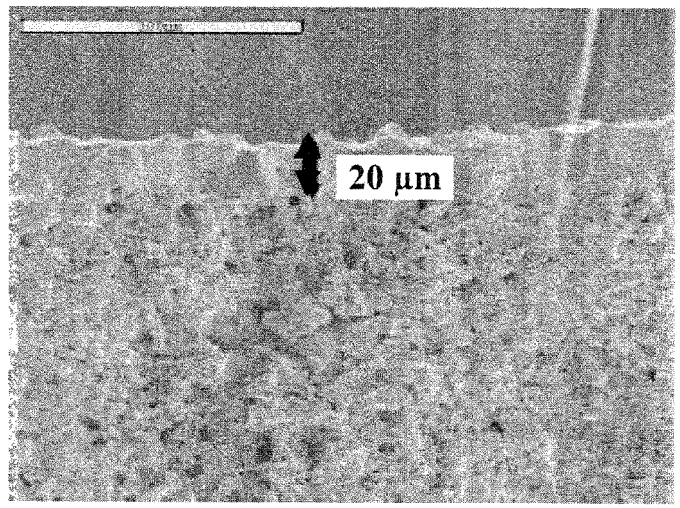
Figure 13:
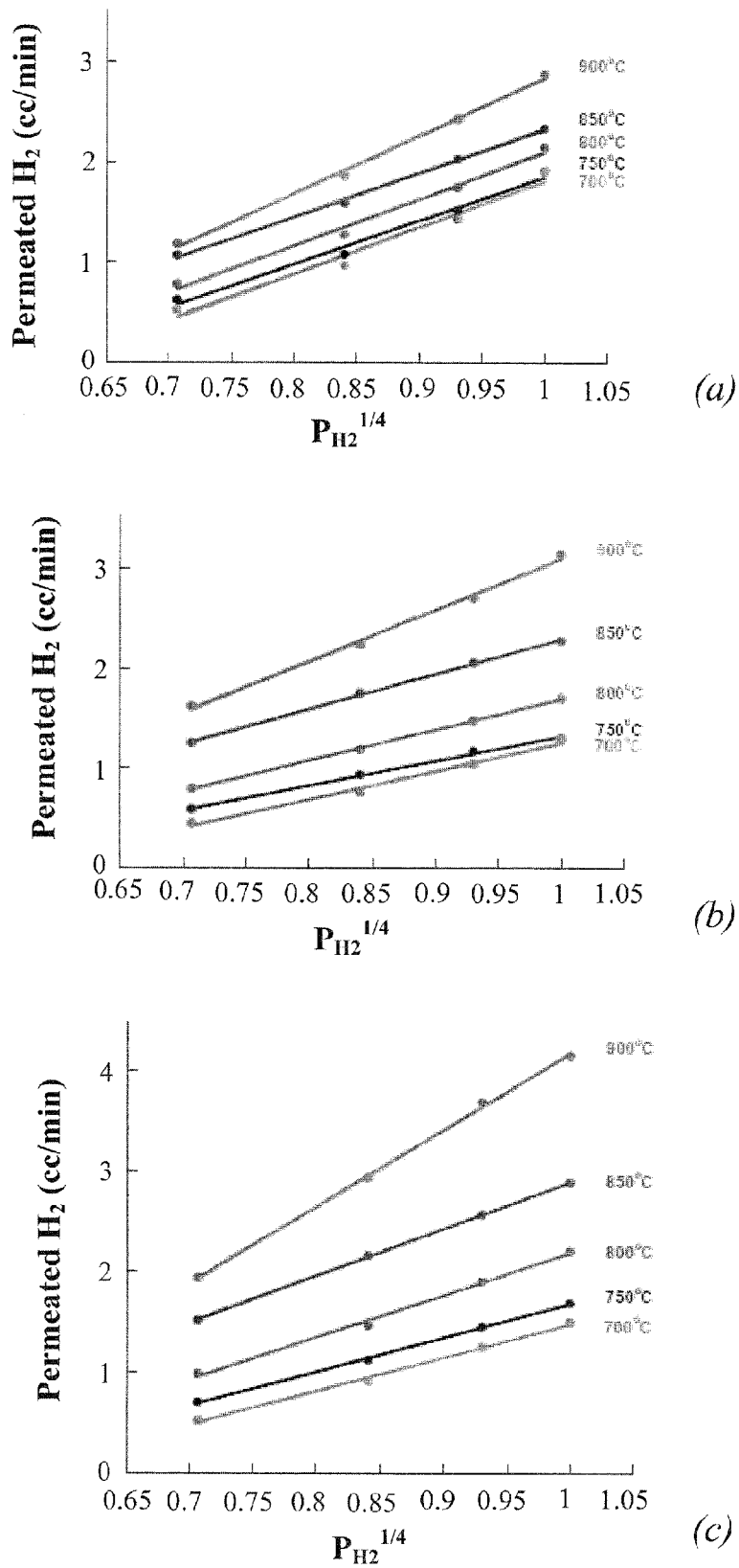
FIG. 13 are plots of the permeation flux for (a) 42.5 μm, (b) 30 μm and (c) 20 μm thick $SrCe_{0.65}Zr_{0.2}Eu_{0.15}O_{3-d}$ membranes as a function of hydrogen partial pressure at various temperatures.
Figure 14:
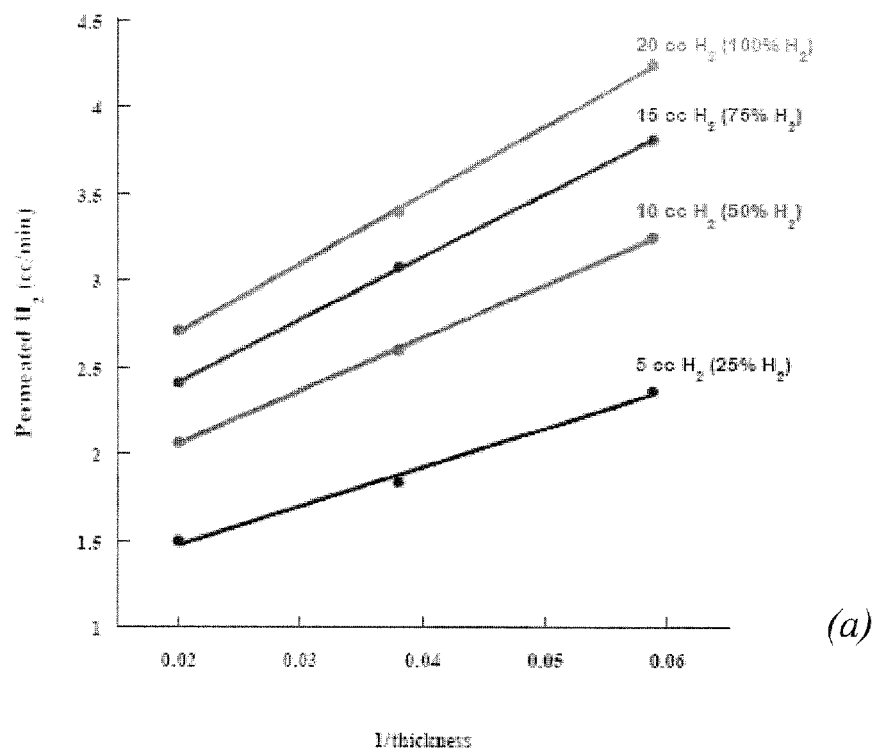
FIG. 14 are plots of the hydrogen permeation flux of $SrCe_{0.7}Zr_{0.2}Eu_{0.1}O_{3-d}$ and $SrCe_{0.65}Zr_{0.2}Eu_{0.15}O_{3-d}$ membranes according to an embodiment of the invention as a function of membrane coating thickness at 900° C. for various hydrogen partial pressures.
Figure 14:
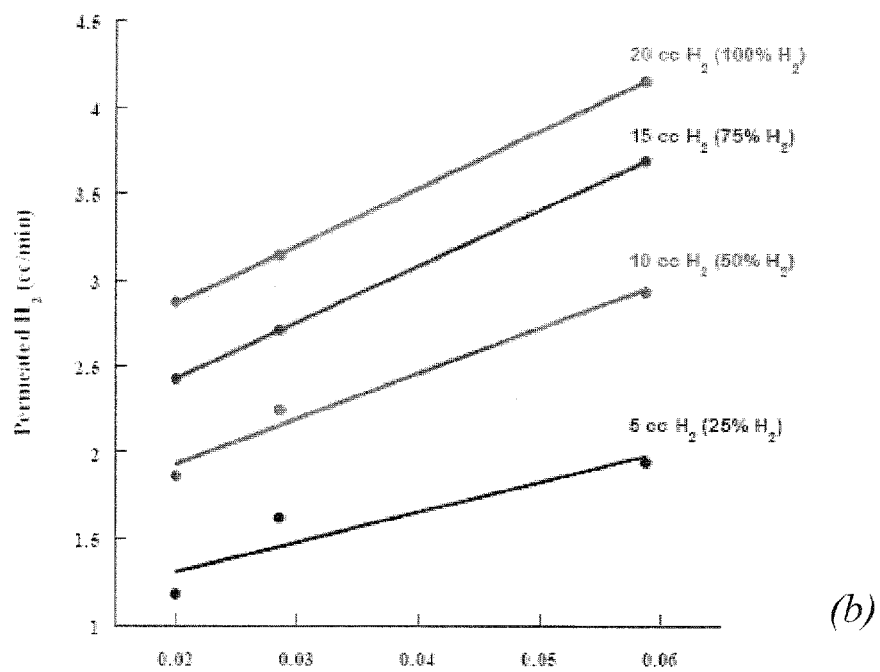

SEM images of (a) 42.5 μm, (b) 30 μm and (c) 20 μm thick $SrCe_{0.65}Zr_{0.2}Eu_{0.15}O_{3-\delta}$ hydrogen membranes are shown in FIG. 12 where a clear delineation between the dense membrane coatings and the porous supports can be seen. FIG. 13 shows the hydrogen permeation flux dependence on the hydrogen partial pressure and temperature for the membranes of FIG. 12. It displays a similar trend of hydrogen partial pressure dependence as did $SrCe_{0.7}Zr_{0.2}Eu_{0.1}O_{3-\delta}$ hydrogen membranes. The hydrogen permeation flux of $SrCe_{0.7}Zr_{0.2}Eu_{0.1}O_{3-\delta}$ and $SrCe_{0.65}Zr_{0.2}Eu_{0.15}O_{3-\delta}$ membrane tubes for various membrane coating thicknesses at 900° C. is shown in FIGS. 14(a) and 14(b), respectively. Hydrogen permeation shows a linear dependence with inverse membrane thickness, indicating that bulk diffusion is the rate-limiting factor for permeation.

Non-Equilibrium $H_2$ Generation in a WGS Reaction

Figure 15:
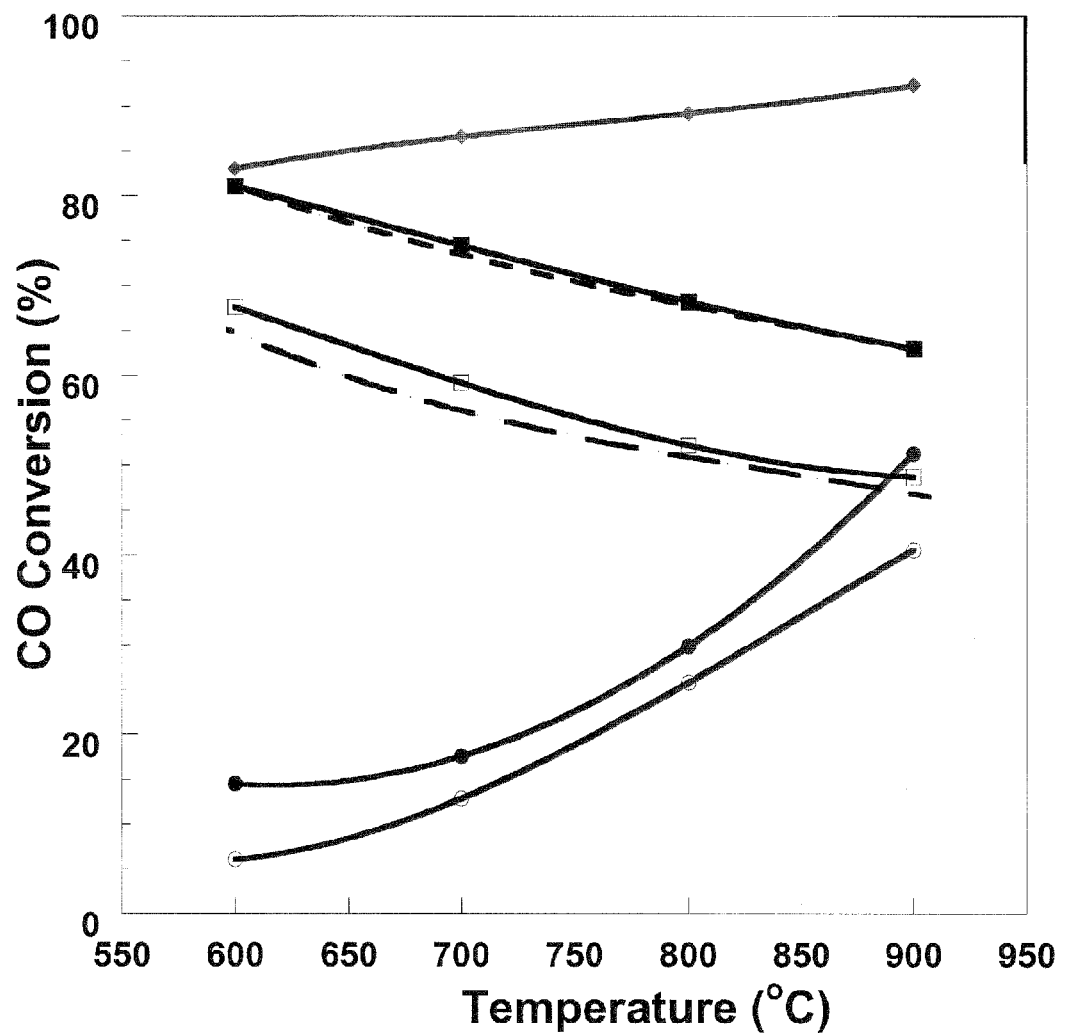
FIG. 15 is a plot of CO conversion as a function of temperature for 3% $H_2O$+3% $CO(H_2O/CO=1:1)$ and 6% $H_2O$+

For embodiments of the invention that involve the WGS reaction, the effective removal of hydrogen to drive the equilibrium to hydrogen production can be employed to increase the conversion of CO and $H_2O$ to $CO_2$ and $H_2$, such that the conversion of CO is very high, particularly at higher temperatures. Although the stability of the porous support, as illustrated in FIG. 9, is inferior to those of the present invention a film of $SrCe_{0.9}Eu_{0.1}O_{3-\delta}$ on a $Ni$—$SrCeO_3$ was used to demonstrate the removal of product $H_2$ and shift of the equilibrium to the conversion of CO, as indicated in FIG. 15, and the $H_2$ flux, as indicated in FIG. 16.

The WGS reaction was carried out in a reactor of the design shown in FIG. 3, where the membrane tube 103 was prepared from polycrystalline $SrCeO_{3-\delta}$, $SrCe_{0.9}Eu_{0.1}O_{3-\delta}$ powder that was prepared by a conventional solid-state reaction on mixed stoichiometric amounts of $SrCO_3$ (99.9%, Alfa-Aesar), $CeO_2$ and $Eu_2O_3$ powders, followed by ball milling and calcining at 1300° C. The $Ni$—$SrCeO_3$ tubular support was fabricated using tape-casting (Pro-Cast) followed by a rolling process. The tubular support was sealed at one end and pre-sintered. $SrCe_{0.9}Eu_{0.1}O_{3-d}$ was coated on the inner side of the pre-sintered support. The tubular membranes were finally sintered at 1450° C. The membrane tube was about 17 cm long and 0.48 cm in diameter. An SEM image confirmed that the membrane is dense and ~23 μm thick on a porous support. A thermal insulator 109 was applied to one end of the membrane tube, formed an insulating region 110 to drop the temperature and allow an O-ring 111 to seal the membrane tube 101. The area of the membrane 101 opposite insulator zone was the active area for reaction and is about 12 cm². The WGS reaction was carried out from 600° C. to 900° C. under 3% CO+3% $H_2O$ and 3% CO+6% $H_2O$ with a total flow rate of 20 sccm balanced by Ar. Gas flow rates were controlled by mass flow controllers.

A high CO conversion maximizes the $H_2$ production. The CO conversion is defined as follows:

$$\text{CO conversion (\%)} = \frac{F_{CO_2}^{out}}{F_{CO}^{in}} \times 100\%$$

where $F_{CO_2}^{out}$ and $F_{CO}^{in}$ are $CO_2$ output flux and CO input flux, respectively.

FIG. 15 shows the CO conversion temperature dependence for different reactor configurations having $H_2O/CO$ ratios of 1:1 and 2:1. The CO conversion decreases as the reaction temperature increases for an un-driven system, which is in line with theoretical values for a closed system, as indicated in FIG. 15 where theoretical values are those of FIGS. 1 and 2. For a CO—$H_2O$ mixture fed into a reactor without use of membrane separation driving reaction by $H_2$ removal, CO conversion was limited to thermodynamic equilibrium values. The CO conversion for system with a 2/1 $H_2O/CO$ ratio driven by $H_2$ removal exceeded thermodynamic limitations, increasing with temperature and was very high at 900° C.

In like manner $H_2$ flux increased with increasing temperature as shown in FIG. 16 as did the CO conversion, allowing for a higher hydrogen production by actively removing the $H_2$ from one side of the membrane. The $H_2$ yield:

$$H_2 \text{ yield (\%)} = \frac{F_{H_2}^{out}}{F_{CO}^{in}} \times 100\%$$

where $F_{H_2}^{out}$ and $F_{CO}^{in}$ are the $H_2$ production and CO input flux, respectively, increased with the CO conversion, as illustrated in FIG. 17.

$CH_4$—$CO_2$ Reforming

A dense ~33 μm thick $SrCe_{0.7}Zr_{0.2}Eu_{0.2}O_{3-\delta}$ membrane coated on a $Ni$—$SrCe_{0.8}Zr_{0.2}O_{3-\delta}$ support was prepared as given above. The feed side of the membrane was exposed to $CH_4$ and $CO_2$ and/or steam. The permeated $H_2$ was swept with He gas at 20 cm³/min, in co-current flow to the feed gas. The flow rates of $CH_4$, $CO_2$ and He were controlled by mass flow controllers. When steam was included to the feed, unreacted steam was condensed on a cold trap before the feed side was analyzed by gas chromatography, using a Varian CP 4900 Gas Chromatograph. The concentrations of the $H_2$ in the sweep gas were analyzed by a mass spectrometer (Dycor QuadLink IPS Quadrupole Gas Analyzer).

The effect of the $CH_4/CO_2$ ratio on the composition of a syngas product was studied using a 10 cm³/min flow of $CH_4$ with various flows of $CO_2$. FIG. 18 shows the $CH_4$ and $CO_2$ conversion and the $CH_4/CO_2$ ratio as a function of temperature. The $CH_4$ and $CO_2$ conversions are defined by the equations:

$$X\mathrm{CH}_4 = \frac{F_{CH_4}^{in} - F_{CH_4}^{out}}{F_{CH_4}^{in}} \times 100\%$$

$$X\mathrm{CO}_2 = \frac{F_{CO_2}^{in} - F_{CO_2}^{out}}{F_{CO_2}^{in}} \times 100\%$$

where $F_i^{in}$ and $F_i^{out}$ ($i=CH_4$ or $CO_2$) are the input and output flux of gas i. The $CH_4$ and $CO_2$ conversions increase with increasing temperature as expected due to the endothermic nature of the transformation. The $CH_4$ conversion was higher for all runs and increases as the $CH_4/CO_2$ ratio decreases.

The hydrogen production is indicated in FIG. 19 where the total $H_2$ production is the sum of the $H_2$ flux on the sweep side of the membrane and the $H_2$ flux on the feed side effluent. For all $CH_4/CO_2$ ratios, the $H_2$ production increases with temperature due to the higher ambipolar conductivity of the membrane and a higher $CH_4$ conversion at high temperatures. Maximum $H_2$ permeation through the membrane 2.2 cm³/min (~0.2 cm³/cm² min) occurred at 900° C. at a $CH_4/CO_2$ ratio of 1/1. The $H_2$ permeation decreases with the $CH_4/CO_2$ ratio. The total $H_2$ production using a $CH_4/CO_2$ ratio of 1/2 does not vary significantly with temperature, but varies at higher $CH_4/CO_2$ ratios. Lower $CH_4/CO_2$ ratios favors the reverse of the WGS reaction, equation (1), above, that consumes $H_2$. Hence, more 117 is consumed at elevated temperature and the total $H_2$ does not significantly increase with temperature even though the $CH_4$ and $CO_2$ conversions increase. A maximum $H_2$ production of 17.0 cm³/min was achieved at 900° C. at a $CH_4/CO_2$ ratio of 1/2.

FIG. 20 shows the $H_2/CO$ ratio in the feed side effluent. The $H_2/CO$ ratio decreases with increasing temperature and decreasing $CH_4/CO_2$ ratios and can be ascribed to a combination of the higher extent of the reversed WGS reaction and higher $H_2$ permeation at elevated temperatures. When the temperature increased from 700 to 900° C., the $H_2/CO$ ratios decreased from 1.00 to 0.91, from 0.95 to 0.84 and from 0.92 to 0.82 for $CH_4/CO_2$ ratios of 1/1, 1/1.5 and 1/2, respectively.

The effect of flow rate on the $CH_4$ and $CO_2$ conversions, $H_2$ production and $H_2/CO$ ratio was studied using a $CH_4/CO_2$ ratio of 1/1.5 and total flow rates of 25, 37.5 and 50 cm³/min at 850 and 900° C. As shown in FIG. 21, the $CH_4$ and $CO_2$ conversion decreases slightly with total flow rate as can be expected from shorter residence time. In contrast, the $H_2/CO$ ratio increases with the total flow rate due to the decreased percentage of $H_2$ that permeates the membrane at higher flow rates. As can be determined from the data plotted in FIG. 22, the percentage of $H_2$ permeating the membrane decreases from 13.1% to 8.8% at 900° C. and from 10.4% to 7.6% at 850° C. as the total flow rates were increased from 20 to 50 cm³/min. The $H_2$ production increased with total flow rates due to the increase of the mass of reactants even though the $CH_4$ and $CO_2$ conversion decreased slightly.

The $H_2/CO$ ratio generated using the membrane reactor is a maximum of 1, while a ratio of 2 is optimal for the Fischer-Tropsch process. To increase the $H_2/CO$ ratio, $H_2O$ was added to the $CH_4/CO_2$ feed to combine CO, reforming of $CH_4$ with steam reforming of $CH_4$, to increase the $H_2/CO$ ratio. Two $CH_4/CO_2/H_2O$ compositions, with 2/1/1 and 2/1/1.5 proportions, were examined with respect to the resulting $H_2/CO$ ratio and $CH_4$ and $CO_2$ conversion for a feed gas composition of 20 cm³/min $CH_4$, 10 cm³/min $CO_2$ and various amounts of steam. FIG. 23 shows the $CH_4$ and $CO_2$ conversion as a function of temperature. The $CH_4$ conversion increases with increasing $H_2O$ concentration. A High $H_2O$ concentration favors steam reforming of $CH_4$ and enhances $CH_4$ conversion. Higher $H_2O$ concentrations result in lower concentrations of $CH_4$ and $CO_2$ since the $CH_4/CO_2$ ratio is fixed at 2/1. As a result, the $CO_2$ conversion decreases. The $CH_4$ and $CO_2$ conversion are 83% and 34% at 900° C. for a $CH_4/CO_2/H_2O$ ratio of 2/1/1, suggesting that more than half of the $CH_4$ conversion occurs through the SMR reaction.

FIG. 24 shows $H_2$ production and the $H_2/CO$ ratio as a function of temperature. The $H_2$ production increases with temperature. The feed effluent $H_2$ flux and the total $H_2$ production increase with increasing $H_2O$ concentration due to the higher $CH_4$ conversion. In contrast, the $H_2$ permeation decreases with increasing $H_2O$ since higher $H_2O$ concentration means higher $P_{O2}$. The $H_2/CO$ ratio of the feed side effluent is 2-2.5 and 2.1-2.6 for $CH_4/CO_2/H_2O$ ratios of 2/1/1 and 2/1/1.5, respectively, as the temperature varies from 700° C. to 900° C. The $H_2/CO$ decrease with temperature trends similarly as that in FIG. 20 without water and is ascribed to the reverse WGS reaction. The $H_2/CO$ ratio of nearly 2 at 900° C. is well matched to that needed for a Fischer-Tropsch process that produces a liquid hydrocarbon fuel.

All patents, patent applications, provisional applications, and publications referred to or cited herein, supra or infra, are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A membrane reactor for the production of hydrogen from a hydrocarbon comprising:
   a high temperature stable housing;
   at least one membrane of proton-electron conducting ceramics comprising a porous support comprising: M'-$Sr_{1-z}M''_zCe_{1-x'-y'}Zr_{x'}M'''_{y'}O_{3-\delta}$, $CeO_2$ or any mixtures thereof where: M' is Ni, Ti, V, Cr, Mn, Fe, Co, Ni, Cu, Nb, Mo, W, Zn, Pt, Ru, Rh, Pd, alloys thereof or mixtures thereof; M'' is Ba, Ca, Mg, Sm, Eu, Gd, Tb, Dy, Ho, Er, Tm, or Yb; M''' is Ti, V, Cr, Mn, Fe, Co, Ni, Cu, Nb, Mo, W, Pr, Nd, Pm, Sm, Eu, Gd, Tb, Dy, Ho, Er, Tm, or Yb; z' is 0 to about 0.5; x' is 0 to about 0.5; y' is 0 to about 0.5; and x'+y'>0; with a Perovskite-type oxide film of the formula $SrCe_{1-x-y}Zr_xM_yP_{3-\delta}$ where: M is at least one of Ti, V, Cr, Mn, Fe, Co, Ni, Cu, Nb, Mo, W, Pr, Nd, Pm, Sm, Eu, Gd, Tb, Dy, Ho, Er, Tm, and Yb; x is 0 to about 0.15 and y is about 0.1 to about 0.3; and at least one of said M is Eu on a surface of said porous support;
   at least one inlet to introduce a feed gas comprising said hydrocarbon and water;
   at least one first outlet to remove an exhaust gas comprising water and carbon dioxide; and
   at least one second outlet to remove the hydrogen comprising gas from said reactor, wherein the Perovskite-type oxide film is stable in the presence of all chemical species of steam methane reforming (SMR) and/or water-gas shift reactions (WGS).

2. The membrane reactor of claim 1, wherein said porous support comprises Ni—SrCe$_{1-x'}$Zr$_{x'}$O$_{3-\delta}$ where x' is about 0.1 to about 0.3.

3. The membrane reactor of claim 1, wherein said housing is quartz, metal, metal alloy or ceramic.

4. The membrane reactor of claim 1, further comprising a second inlet to direct a carrier gas to an isolated volume in contact with said surface having said film of said membrane.

5. The membrane reactor of claim 1, wherein said membrane comprises a tube, wherein the internal surface of said tube has said film.

6. A membrane reactor for the production of hydrogen from a hydrocarbon comprising:
a high temperature stable housing;
at least one membrane of proton-electron conducting ceramics comprising a porous support comprising: M'-Sr$_{1-z}$M''$_z$Ce$_{1-x'-y'}$Zr$_{x'}$M'''$_{y'}$O$_{3-\delta}$, Al$_2$O$_3$, mullite ZrO$_2$, CeO$_2$ or any mixtures thereof where: M' is Ni, Ti, V, Cr, Mn, Fe, Co, Ni, Cu, Nb, Mo, W, Zn, Pt, Ru, Rh, Pd, alloys thereof or mixtures thereof; M" is Ba, Ca, Mg, Sm, Eu, Gd, Tb, Dy, Ho, Er, Tm, or Yb; M'" is Ti, V, Cr, Mn, Fe, Co, Ni, Cu, Nb, Mo, W, Pr, Nd, Pm, Sm, Eu, Gd, Tb, Dy, Ho, Er, Tm, or Yb; z' is 0 to about 0.5; x' is 0 to about 0.5; y' is 0 to about 0.5; and x'+y'>0; with a Perovskite-type oxide film of the formula SrCe$_{1-x-y}$Zr$_x$M$_y$O$_{3-\delta}$ where: M is at least one of Ti, V, Cr, Mn, Fe, Co, Ni, Cu, Nb, Mo, W, Pr, Nd, Pm, Sm, Eu, Gd, Tb, Dy, Ho, Er, Tm, and Yb; x is 0.1 to about 0.2 and y is about 0.1 to about 0.3; and at least one of said M is Eu on a surface of said porous support;
at least one inlet to introduce a feed gas comprising said hydrocarbon and water;
at least one first outlet to remove an exhaust gas comprising water and carbon dioxide; and
at least one second outlet to remove the hydrogen comprising gas from said reactor, wherein the Perovskite-type oxide film is stable in the presence of all chemical species of steam methane reforming (SMR) and/or water-gas shift reactions (WGS).

7. The membrane reactor of claim 6, wherein said porous support comprises Ni—SrCe$_{1-x'}$Zr$_{x'}$O$_{3-\delta}$ where x' is about 0.1 to about 0.3.

8. The membrane reactor of claim 6, wherein said housing is quartz, metal, metal alloy or ceramic.

9. The membrane reactor of claim 6, further comprising a second inlet to direct a carrier gas to an isolated volume in contact with said surface having said film of said membrane.

10. The membrane reactor of claim 6, wherein said membrane comprises a tube, wherein the internal surface of said tube has said film.

* * * * *

UNITED STATES PATENT AND TRADEMARK OFFICE
CERTIFICATE OF CORRECTION

| | | |
|---|---|---|
| PATENT NO. | : 8,845,768 B2 | Page 1 of 4 |
| APPLICATION NO. | : 12/996687 | |
| DATED | : September 30, 2014 | |
| INVENTOR(S) | : Eric D. Wachsman et al. | |

It is certified that error appears in the above-identified patent and that said Letters Patent is hereby corrected as shown below:

Title page, Abstract (57),
Line 5, "M' is Ni, Ti, V, Cr, Mn, Fe, Co, Ni, Cu" should read --M' is Ni, Ti, V, Cr, Mn, Fe, Co, Cu--.

In the specification,

Column 2,
Line 27, "$BaCe_{1-x}$-$M_xO_3$-type" should read --$BaCe_{1-x}M_xO_3$-type--.
Line 51, "$O_{3-d}$" should read --$O_{3-\delta}$--.
Lines 52-53, "M' is Ni, Ti, V, Cr, Mn, Fe, Co, Ni, Cu" should read --M' is Ni, Ti, V, Cr, Mn, Fe, Co, Cu--.
Line 58, "$O_{3-d}$" should read --$O_{3-\delta}$--.
Line 60, "$O_{3-d}$" should read --$O_{3-\delta}$--.

Column 3,
Line 3, "$O_{3-d}$" should read --$O_{3-\delta}$--.
Line 9, "$O_{3-d}$" should read --$O_{3-\delta}$--.
Line 11, "M' is Ni, Ti, V, Cr, Mn, Fe, Co, Ni, Cu" should read --M' is Ni, Ti, V, Cr, Mn, Fe, Co, Cu--.
Line 18, "$O_{3-d}$" should read --$O_{3-\delta}$--.
Line 19, "$O_{3-d}$" should read --$O_{3-\delta}$--.
Line 24, "$O_{3-d}$" should read --$O_{3-\delta}$--.
Line 25, "$O_{3-d}$" should read --$O_{3-\delta}$--.
Line 28, "$O_{3-d}$" should read --$O_{3-\delta}$--.
Line 32, "$O_{3-d}$" should read --$O_{3-\delta}$--.
Line 35, "to unlit the" should read --to form the--.
Line 53, "$O_{3-d}$" should read --$O_{3-\delta}$--.

Column 4,
Line 16, "$O_{3-d}$ and" should read --$O_{3-\delta}$ and--.

Signed and Sealed this
First Day of December, 2015

Michelle K. Lee
*Director of the United States Patent and Trademark Office*

CERTIFICATE OF CORRECTION (continued)
U.S. Pat. No. 8,845,768 B2

Column 4 (cont.),
Line 16, "$O_{3-d}$" should read --$O_{3-\delta}$--.
Line 19, "$O_{3-d}$" should read --$O_{3-\delta}$--.
Line 20, "$O_{3-d}$ and $SrCe_{0.6}Zr_{0.3}Eu_{0.1}O_{3-d}$" should read --$O_{3-\delta}$ and $SrCe_{0.6}Zr_{0.3}Eu_{0.1}O_{3-\delta}$--.
Lines 23-24, "$O_{3-d}$ and $SrCe_{0.6}Zr_{0.3}Eu_{0.1}O_{3-d}$" should read --$O_{3-\delta}$ and $SrCe_{0.6}Zr_{0.3}Eu_{0.1}O_{3-\delta}$--.
Line 27, "$O_{3-d}$" should read --$O_{3-\delta}$--.
Line 29, "$O_{3-d}$" should read --$O_{3-\delta}$--.
Line 35, "$O_{3-d}$ and $SrCe_{0.6}Zr_{0.3}Eu_{0.1}O_{3-d}$" should read --$O_{3-\delta}$ and $SrCe_{0.6}Zr_{0.3}Eu_{0.1}O_{3-\delta}$--.
Line 39, "$O_{3-d}$" should read --$O_{3-\delta}$--.
Line 40, "$O_{3-d}$" should read --$O_{3-\delta}$--.
Line 46, "$O_{3-d}$" should read --$O_{3-\delta}$--.
Line 50, "$SrCe_{0.7}Zr_{0.2}Eu_{0.1}O_{3-d}$ d on" should read --$SrCe_{0.7}Zr_{0.2}Eu_{0.1}O_{3-\delta}$ on--.
Line 54, "$O_{3-d}$" should read --$O_{3-\delta}$--.
Line 58, "$O_{3-d}$" should read --$O_{3-\delta}$--.
Line 62, "$O_{3-d}$ and $SrCe_{0.6}Zr_{0.3}Eu_{0.1}O_{3-d}$" should read --$O_{3-\delta}$ and $SrCe_{0.6}Zr_{0.3}Eu_{0.1}O_{3-\delta}$--.

Column 5,
Line 2, "$O_{3-d}$" should read --$O_{3-\delta}$--.
Line 3, "¦(2:)" should read --■ (2:1)--.
Line 7, "$O_{3-d}$" should read --$O_{3-\delta}$--.
Line 10, "¦$H_2$ production" should read --■ $H_2$ production--.
Line 16, "$O_{3-d}$" should read --$O_{3-\delta}$--.
Lines 17-18, "where: ¦ permeated" should read --where: ■ permeated--.
Line 25, "¦ ($CO_2$); 1/1.5 ($CH_4$)" should read --◊ ($CO_2$); 1/1.5 ■ ($CH_4$)--.
Line 33, "1/2 ¦(total $H_2$)" should read --1/2 ■ (total $H_2$)--.
Line 39, "1/1¦1/1.5" should read --1/1, ■ 1/1.5--.
Line 46, "$XCH_4$¦$CO_2$" should read --$XCH_4$, ■ $CO_2$--.
Line 54, "¦$H_2$ (feed effluent)" should read --■ $H_2$ (feed effluent)--.

Column 6,
Line 20, "$ABO_{3-d}$" should read --$ABO_{3-\delta}$--.
Line 35, "$ABO_{3-d}$" should read --$ABO_{3-\delta}$--.

Column 7,
Line 1, "$Zr_xM_yO_{3-d}$" should read --$Zr_xM_yO_{3-\delta}$--.
Line 17, "$O_{3-d}$" should read --$O_{3-\delta}$--.
Line 27, "$O_{3-d}$" should read --$O_{3-\delta}$--.
Line 36, "$O_{3-d}$" should read --$O_{3-\delta}$--.
Line 39, "$O_{3-d}$" should read --$O_{3-\delta}$--.
Line 54, "$O_{3-d}$" should read --$O_{3-\delta}$--.

Column 8,
Line 20, "$O_{3-d}$" should read --$O_{3-\delta}$--.
Line 65, "$SrCe_{0.9}Eu_{0.1}O_{3-d}$ and $SrCe_{0.7}Zr_{0.2}Eu_{0.1}O_{3-d}$" should read --$SrCe_{0.9}Eu_{0.1}O_{3-\delta}$ and $SrCe_{0.7}Zr_{0.2}Eu_{0.1}O_{3-\delta}$--.

Column 9,
Line 13, "$O_{3-d}$ and" should read --$O_{3-\delta}$ and--.
Line 13, "$O_{3-d}$" should read --$O_{3-\delta}$--.
Line 16, "$O_{3-d}$" should read --$O_{3-\delta}$--.
Line 16, "$O_{3-d}$ peaks" should read --$O_{3-\delta}$ peaks--.
Line 19, "$O_{3-d}$" should read --$O_{3-\delta}$--.
Lines 21-22, "$O_{3-d}$, $SrCe_{0.7}Zr_{0.2}Eu_{0.1}O_{3-d}$" should read --$O_{3-\delta}$, $SrCe_{0.7}Zr_{0.2}Eu_{0.1}O_{3-\delta}$--.
Line 22, "$SrCe_{0.6}Zr_{0.3}Eu_{0.3}O_{3-d}$" should read --$SrCe_{0.6}Zr_{0.3}Eu_{0.1}O_{3-\delta}$--.
Line 26, "$O_{3-d}$ and $SrZr_{0.2}Ce_{0.7}Eu_{0.1}O_{3-d}$" should read --$O_{3-\delta}$ and $SrZr_{0.2}Ce_{0.7}Eu_{0.1}O_{3-\delta}$--.
Line 28, "$O_{3-d}$" should read --$O_{3-\delta}$--.
Line 30, "$O_{3-d}$" should read --$O_{3-\delta}$--.
Line 31, "$O_{3-d}$" should read --$O_{3-\delta}$--.
Line 32, "$O_{3-d}$" should read --$O_{3-\delta}$--.
Line 35, "$O_{3-d}$" should read --$O_{3-\delta}$--.
Line 44, "$O_{3-d}$" should read --$O_{3-\delta}$--.
Line 63, "$O_{3-d}$" should read --$O_{3-\delta}$--.
Line 64, "$O_{3-d}$" should read --$O_{3-\delta}$--.
Line 67, "$O_{3-d}$" should read --$O_{3-\delta}$--.

Column 10,
Line 1, "$O_{3-d}$" should read --$O_{3-\delta}$--.
Line 4, "$O_{3-d}$" should read --$O_{3-\delta}$--.
Line 5, "$O_{3-d}$" should read --$O_{3-\delta}$--.
Line 6, "$O_{3-d}$" should read --$O_{3-\delta}$--.
Line 8, "$O_{3-d}$" should read --$O_{3-\delta}$--.
Line 9, "$O_{3-d}$" should read --$O_{3-\delta}$--.
Line 11, "$O_{3-d}$" should read --$O_{3-\delta}$--.
Line 17, "$O_{3-d}$" should read --$O_{3-\delta}$--.
Line 19, "$O_{3-d}$" should read --$O_{3-\delta}$--.
Line 29, "$O_{3-d}$ on" should read --$O_{3-\delta}$ on--.
Line 29, "$O_{3-d}$" should read --$O_{3-\delta}$--.
Line 36, "$O_{3-d}$" should read --$O_{3-\delta}$--.
Line 38, "$O_{3-d}$" should read --$O_{3-\delta}$--.
Line 39, "$O_{3-d}$" should read --$O_{3-\delta}$--.
Line 41, "$O_{3-d}$" should read --$O_{3-\delta}$--.
Line 46, "$O_{3-d}$" should read --$O_{3-\delta}$--.
Line 49, "$O_{3-d}$" should read --$O_{3-\delta}$--.
Line 64, "$O_{3-d}$" should read --$O_{3-\delta}$--.
Line 67, "$O_{3-d}$" should read --$O_{3-\delta}$--.

Column 11,
Line 12, "$O_{3-d}$" should read --$O_{3-\delta}$--.
Line 14, "$O_{3-d}$" should read --$O_{3-\delta}$--.

CERTIFICATE OF CORRECTION (continued)
U.S. Pat. No. 8,845,768 B2

Column 12,
Line 5, "$O_{3-d}$" should read --$O_{3-\delta}$--.
Line 56, "$SrCe_{0.7}Zr_{0.2}Eu_{0.2}O_{3-\delta}$" should read --$SrCe_{0.7}Zr_{0.2}Eu_{0.1}O_{3-\delta}$--.

Column 13,
Line 34, "more 117" should read --more $H_2$--.

Column 14,
Line 47, "M' is Ni, Ti, V, Cr, Mn, Fe, Co, Ni, Cu" should read --M' is Ni, Ti, V, Cr, Mn, Fe, Co, Cu--.
Line 54, "$SrCe_{1-x-y}Zr_xM_yP_{3-\delta}$ where" should read --$SrCe_{1-x-y}Zr_xM_yO_{3-\delta}$ where--.

Column 15,
Lines 18-19, "M' is Ni, Ti, V, Cr, Mn, Fe, Co, Ni, Cu" should read --M' is Ni, Ti, V, Cr, Mn, Fe, Co, Cu--.

UNITED STATES PATENT AND TRADEMARK OFFICE
CERTIFICATE OF CORRECTION

PATENT NO. : 8,845,768 B2  
APPLICATION NO. : 12/996687  
DATED : September 30, 2014  
INVENTOR(S) : Eric D. Wachsman et al.

Page 1 of 4

It is certified that error appears in the above-identified patent and that said Letters Patent is hereby corrected as shown below:

Title page, Abstract (57),  
Line 5, "M' is Ni, Ti, V, Cr, Mn, Fe, Co, Ni, Cu" should read --M' is Ni, Ti, V, Cr, Mn, Fe, Co, Cu--.

In the specification,

Column 2,  
Line 21, "$10^{-2}$ $O^{-1}cm^{-1}$ at 600°C" should read --$10^{-2}$ $\Omega^{-1}cm^{-1}$ at 600°C--.  
Line 27, "$BaCe_{1-x}$-$M_xO_3$-type" should read --$BaCe_{1-x}M_xO_3$-type--.  
Line 51, "$O_{3-d}$" should read --$O_{3-\delta}$--.  
Lines 52-53, "M' is Ni, Ti, V, Cr, Mn, Fe, Co, Ni, Cu" should read --M' is Ni, Ti, V, Cr, Mn, Fe, Co, Cu--.  
Line 58, "$O_{3-d}$" should read --$O_{3-\delta}$--.  
Line 60, "$O_{3-d}$" should read --$O_{3-\delta}$--.

Column 3,  
Line 3, "$O_{3-d}$" should read --$O_{3-\delta}$--.  
Line 9, "$O_{3-d}$" should read --$O_{3-\delta}$--.  
Line 11, "M' is Ni, Ti, V, Cr, Mn, Fe, Co, Ni, Cu" should read --M' is Ni, Ti, V, Cr, Mn, Fe, Co, Cu--.  
Line 18, "$O_{3-d}$" should read --$O_{3-\delta}$--.  
Line 19, "$O_{3-d}$" should read --$O_{3-\delta}$--.  
Line 24, "$O_{3-d}$" should read --$O_{3-\delta}$--.  
Line 25, "$O_{3-d}$" should read --$O_{3-\delta}$--.  
Line 28, "$O_{3-d}$" should read --$O_{3-\delta}$--.  
Line 32, "$O_{3-d}$" should read --$O_{3-\delta}$--.  
Line 35, "to unlit the" should read --to form the--.  
Line 53, "$O_{3-d}$" should read --$O_{3-\delta}$--.

This certificate supersedes the Certificate of Correction issued December 1, 2015.

Signed and Sealed this  
Eighth Day of March, 2016

Michelle K. Lee  
*Director of the United States Patent and Trademark Office*

CERTIFICATE OF CORRECTION (continued)
U.S. Pat. No. 8,845,768 B2

Column 4,
Line 16, "$O_{3-d}$ and" should read --$O_{3-\delta}$ and--.
Line 16, "$O_{3-d}$" should read --$O_{3-\delta}$--.
Line 19, "$O_{3-d}$" should read --$O_{3-\delta}$--.
Line 20, "$O_{3-d}$ and $SrCe_{0.6}Zr_{0.3}Eu_{0.1}O_{3-d}$" should read --$O_{3-\delta}$ and $SrCe_{0.6}Zr_{0.3}Eu_{0.1}O_{3-\delta}$--.
Lines 23-24, "$O_{3-d}$ and $SrCe_{0.6}Zr_{0.3}Eu_{0.1}O_{3-d}$" should read --$O_{3-\delta}$ and $SrCe_{0.6}Zr_{0.3}Eu_{0.1}O_{3-\delta}$--.
Line 27, "$O_{3-d}$" should read --$O_{3-\delta}$--.
Line 29, "$O_{3-d}$" should read --$O_{3-\delta}$--.
Line 35, "$O_{3-d}$ and $SrCe_{0.6}Zr_{0.3}Eu_{0.1}O_{3-d}$" should read --$O_{3-\delta}$ and $SrCe_{0.6}Zr_{0.3}Eu_{0.1}O_{3-\delta}$--.
Line 39, "$O_{3-d}$" should read --$O_{3-\delta}$--.
Line 40, "$O_{3-d}$" should read --$O_{3-\delta}$--.
Line 46, "$O_{3-d}$" should read --$O_{3-\delta}$--.
Line 50, "$SrCe_{0.7}Zr_{0.2}Eu_{0.1}O_{3-d}$ d on" should read --$SrCe_{0.7}Zr_{0.2}Eu_{0.1}O_{3-\delta}$ on--.
Line 54, "$O_{3-d}$" should read --$O_{3-\delta}$--.
Line 58, "$O_{3-d}$" should read --$O_{3-\delta}$--.
Line 62, "$O_{3-d}$ and $SrCe_{0.6}Zr_{0.3}Eu_{0.1}O_{3-d}$" should read --$O_{3-\delta}$ and $SrCe_{0.6}Zr_{0.3}Eu_{0.1}O_{3-\delta}$--.

Column 5,
Line 2, "$O_{3-d}$" should read --$O_{3-\delta}$--.
Line 3, "¦(2:)" should read --■ (2:1)--.
Line 7, "$O_{3-d}$" should read --$O_{3-\delta}$--.
Line 10, "¦$H_2$ production" should read --■ $H_2$ production--.
Line 16, "$O_{3-d}$" should read --$O_{3-\delta}$--.
Lines 17-18, "where: ¦ permeated" should read --where: ■ permeated--.
Line 25, "¦ ($CO_2$); 1/1.5 ($CH_4$)" should read --◊ ($CO_2$); 1/1.5 ■ ($CH_4$)--.
Line 33, "1/2 ¦(total $H_2$)" should read --1/2 ■ (total $H_2$)--.
Line 39, "1/1¦1/1.5" should read --1/1, ■ 1/1.5--.
Line 46, "$XCH_4$¦$CO_2$" should read --$XCH_4$, ■ $CO_2$--.
Line 54, "¦$H_2$ (feed effluent)" should read --■ $H_2$ (feed effluent)--.

Column 6,
Line 20, "$ABO_{3-d}$" should read --$ABO_{3-\delta}$--.
Line 35, "$ABO_{3-d}$" should read --$ABO_{3-\delta}$--.

Column 7,
Line 1, "$Zr_xM_yO_{3-d}$" should read --$Zr_xM_yO_{3-\delta}$--.
Line 17, "$O_{3-d}$" should read --$O_{3-\delta}$--.
Line 27, "$O_{3-d}$" should read --$O_{3-\delta}$--.
Line 36, "$O_{3-d}$" should read --$O_{3-\delta}$--.
Line 39, "$O_{3-d}$" should read --$O_{3-\delta}$--.
Line 54, "$O_{3-d}$" should read --$O_{3-\delta}$--.

Column 8,
Line 20, "$O_{3-d}$" should read --$O_{3-\delta}$--.

CERTIFICATE OF CORRECTION (continued)
U.S. Pat. No. 8,845,768 B2

Column 8 (cont.),
Line 65, "$SrCe_{0.9}Eu_{0.1}O_{3-d}$ and $SrCe_{0.7}Zr_{0.2}Eu_{0.1}O_{3-d}$" should read --$SrCe_{0.9}Eu_{0.1}O_{3-\delta}$ and $SrCe_{0.7}Zr_{0.2}Eu_{0.1}O_{3-\delta}$--.

Column 9,
Line 13, "$O_{3-d}$ and" should read --$O_{3-\delta}$ and--.
Line 13, "$O_{3-d}$" should read --$O_{3-\delta}$--.
Line 16, "$O_{3-d}$" should read --$O_{3-\delta}$--.
Line 16, "$O_{3-d}$ peaks" should read --$O_{3-\delta}$ peaks--.
Line 19, "$O_{3-d}$" should read --$O_{3-\delta}$--.
Lines 21-22, "$O_{3-d}$, $SrCe_{0.7}Zr_{0.2}Eu_{0.1}O_{3-d}$" should read --$O_{3-\delta}$, $SrCe_{0.7}Zr_{0.2}Eu_{0.1}O_{3-\delta}$--.
Line 22, "$SrCe_{0.6}Zr_{0.3}Eu_{0.3}O_{3-d}$" should read --$SrCe_{0.6}Zr_{0.3}Eu_{0.1}O_{3-\delta}$--.
Line 26, "$O_{3-d}$ and $SrZr_{0.2}Ce_{0.7}Eu_{0.1}O_{3-d}$" should read --$O_{3-\delta}$ and $SrZr_{0.2}Ce_{0.7}Eu_{0.1}O_{3-\delta}$--.
Line 28, "$O_{3-d}$" should read --$O_{3-\delta}$--.
Line 30, "$O_{3-d}$" should read --$O_{3-\delta}$--.
Line 31, "$O_{3-d}$" should read --$O_{3-\delta}$--.
Line 32, "$O_{3-d}$" should read --$O_{3-\delta}$--.
Line 35, "$O_{3-d}$" should read --$O_{3-\delta}$--.
Line 44, "$O_{3-d}$" should read --$O_{3-\delta}$--.
Line 63, "$O_{3-d}$" should read --$O_{3-\delta}$--.
Line 64, "$O_{3-d}$" should read --$O_{3-\delta}$--.
Line 67, "$O_{3-d}$" should read --$O_{3-\delta}$--.

Column 10,
Line 1, "$O_{3-d}$" should read --$O_{3-\delta}$--.
Line 4, "$O_{3-d}$" should read --$O_{3-\delta}$--.
Line 5, "$O_{3-d}$" should read --$O_{3-\delta}$--.
Line 6, "$O_{3-d}$" should read --$O_{3-\delta}$--.
Line 8, "$O_{3-d}$" should read --$O_{3-\delta}$--.
Line 9, "$O_{3-d}$" should read --$O_{3-\delta}$--.
Line 11, "$O_{3-d}$" should read --$O_{3-\delta}$--.
Line 17, "$O_{3-d}$" should read --$O_{3-\delta}$--.
Line 19, "$O_{3-d}$" should read --$O_{3-\delta}$--.
Line 29, "$O_{3-d}$ on" should read --$O_{3-\delta}$ on--.
Line 29, "$O_{3-d}$" should read --$O_{3-\delta}$--.
Line 36, "$O_{3-d}$" should read --$O_{3-\delta}$--.
Line 38, "$O_{3-d}$" should read --$O_{3-\delta}$--.
Line 39, "$O_{3-d}$" should read --$O_{3-\delta}$--.
Line 41, "$O_{3-d}$" should read --$O_{3-\delta}$--.
Line 46, "$O_{3-d}$" should read --$O_{3-\delta}$--.
Line 49, "$O_{3-d}$" should read --$O_{3-\delta}$--.
Line 64, "$O_{3-d}$" should read --$O_{3-\delta}$--.
Line 67, "$O_{3-d}$" should read --$O_{3-\delta}$--.

CERTIFICATE OF CORRECTION (continued)
U.S. Pat. No. 8,845,768 B2

Column 11,
Line 12, "$O_{3-d}$" should read --$O_{3-\delta}$--.
Line 14, "$O_{3-d}$" should read --$O_{3-\delta}$--.

Column 12,
Line 5, "$O_{3-d}$" should read --$O_{3-\delta}$--.
Line 56, "$SrCe_{0.7}Zr_{0.2}Eu_{0.2}O_{3-\delta}$" should read --$SrCe_{0.7}Zr_{0.2}Eu_{0.1}O_{3-\delta}$--.

Column 13,
Line 34, "more 117" should read --more $H_2$--.

Column 14,
Line 47, "M' is Ni, Ti, V, Cr, Mn, Fe, Co, Ni, Cu" should read --M' is Ni, Ti, V, Cr, Mn, Fe, Co, Cu--.
Line 54, "$SrCe_{1-x-y}Zr_xM_yP_{3-\delta}$ where" should read --$SrCe_{1-x-y}Zr_xM_yO_{3-\delta}$ where--.

Column 15,
Lines 18-19, "M' is Ni, Ti, V, Cr, Mn, Fe, Co, Ni, Cu" should read --M' is Ni, Ti, V, Cr, Mn, Fe, Co, Cu--.